(12) United States Patent
Marshall

(10) Patent No.: US 8,331,281 B2
(45) Date of Patent: Dec. 11, 2012

(54) LINK SUPPORTABILITY IN A WCDMA COMMUNICATIONS SYSTEM

(75) Inventor: James Wade Marshall, Purcellville, VA (US)

(73) Assignee: The MITRE Corporation, McLean, VA (US)

( * ) Notice: Subject to any disclaimer, the term of this patent is extended or adjusted under 35 U.S.C. 154(b) by 1104 days.

(21) Appl. No.: 12/245,452

(22) Filed: Oct. 3, 2008

(65) Prior Publication Data

US 2009/0168861 A1     Jul. 2, 2009

Related U.S. Application Data

(60) Provisional application No. 60/977,264, filed on Oct. 3, 2007.

(51) Int. Cl.
*H04B 7/216* (2006.01)
(52) U.S. Cl. .................................. 370/320; 370/441
(58) Field of Classification Search ................. None
See application file for complete search history.

(56) References Cited

U.S. PATENT DOCUMENTS

| | | | |
|---|---|---|---|
| 6,847,327 B2 * | 1/2005 | Ylitalo | 342/407 |
| 7,054,593 B2 * | 5/2006 | de La Chapelle et al. | 455/13.4 |
| 7,302,226 B2 * | 11/2007 | Stephenson | 455/12.1 |

OTHER PUBLICATIONS

Marshall et al., "Satcom loading analysis with heterogeneous gain states," MILCOM 2002 Proceedings, Oct. 7-10, 2002, vol. 1, pp. 136-141.

* cited by examiner

*Primary Examiner* — Robert Wilson
(74) *Attorney, Agent, or Firm* — Sterne, Kessler, Goldstein & Fox P.L.L.C.

(57) ABSTRACT

A method, computer program product, and system are provided for computing link supportability in a WCDMA communications system. For example, the method can be used to calculate link supportability of a transponder in satellite communications system (e.g. MUOS) in a user-to-base direction. This method can include expressing a carrier signal to noise ratio spectral density for a communication link of interest in terms of a transponder input power of the communication link of interest, a spectral overlap factor representative of one or more interfering communication links, and a transponder input power of the one or more interfering communication links. Assumptions and approximations can be made to simplify the spectral density expression in order to reduce a dimensionality of terms used in the computation of the expression. As such, in reducing dimensionality, the expression becomes a manageable computation for WCDMA communication systems to evaluate.

93 Claims, 10 Drawing Sheets

LINK SUPPORTABILITY IN A WCDMA COMMUNICATIONS SYSTEM

CROSS-REFERENCE TO RELATED APPLICATION

This application claims the benefit of U.S. Provisional Application No. 60/977,264, filed Oct. 3, 2007, titled "Power Calculation Algorithms for MUOS and WCDMA," which is incorporated herein by reference in its entirety.

STATEMENT UNDER MPEP 310

The U.S. government has a paid-up license in this invention and the right in limited circumstances to require the patent owner to license others on reasonable terms as provided for by the terms of Project No. 0707V490-A3, awarded by Army.

BACKGROUND

1. Field

Embodiments of the present invention relate generally to Wideband Code Division Multiple Access (WCDMA) communications systems. More specifically, embodiments of the present invention relate to assessing communication link supportability in a WCDMA communications system.

2. Background

Wideband Code Division Multiple Access (WCDMA) is a type of CDMA communication protocol that employs a wideband spread-spectrum mobile air interface and utilizes a direct-sequence spread spectrum method of asynchronous CDMA to support communication among users. An underlying concept of WCDMA is the ability for two or more transmitters (e.g., satellite transponders) to send information simultaneously over a single communications channel. This allows several users to share a bandwidth of frequencies.

Mobile User Objective System (MUOS) is a communications system that can implement the WCDMA communications protocol. The MUOS provides beyond line of sight communication for military users. The MUOS operates in an ultra high frequency (UHF) band (e.g., 300 MHz to 3 GHz frequency range) and provides users with voice, data, and video communication beyond line of sight. By operating in the UHF band, a lower frequency band than terrestrial cellular networks, the MUOS provides communications to users in "tough-to-reach" environments, such as heavily-forested areas.

An example MUOS constellation can have five satellites, where four satellites are in operation with one satellite used as a spare. The MUOS can have multiple carrier signals and communication beams for each satellite in order to facilitate communication among users of the system, where each communication beam includes a number of communication links. Communication links to the satellite constellation can be made on-demand by users and then released just as easily, freeing resources for other users. One important consideration in the MUOS, and other communication systems that implement WCDMA, is an assessment of communication link supportability of the system to ensure adequate communication resources among users.

SUMMARY

Methods, computer program products, and systems are provided for computing link supportability in a WCDMA communications system.

Embodiments of the invention include a method for computing communication link supportability of a transponder in a WCDMA communications system in a user-to-base direction based on bounded or approximate performance. The method includes the following: computing a carrier to noise spectral density for a communication link of interest ($c_{m,ni}$) and a spectral overlap of a plurality of communication links ($\Delta_{m,nk}$); accounting for a desired carrier to noise spectral density for the communication link of interest ($\phi_{m,ni}$) and a noise factor in the transponder ($\theta_{m,ni}$) based on the desired carrier to noise spectral density ($\phi_{m,ni}$); computing an uplink path gain for the communication link of interest ($a_{m,n,ni}$) and for one or more interfering communication links ($a_{m,n,kj}$); adjusting the spectral overlap of the plurality of communication links ($\Delta_{m,nk}$) for uplink path gains from a plurality of communication beams ($a_{m,n,ni}$ and $a_{m,n,kj}$); defining a reduced dimension spectral overlap values ($\delta_{m,nk}$) based on the adjusted spectral overlap ($\rho_{m,k,kj}$) of the plurality of communication beams; applying the reduced dimension spectral overlap values ($\delta_{m,nk}$) to an expression that defines a transponder input power ($x_{m,ni}$) for a communication beam of interest (n), wherein calculation of the transponder input power ($x_{m,ni}$) can be expressed as a set of matrices, each matrix ($\Gamma_m$) in the set of matrices containing a plurality of matrix elements ($\gamma$); defining matrix each element ($\gamma$) of each matrix ($\Gamma_m$) based on the weighted sum of values ($\delta_{m,nk}$); assessing whether each matrix ($\Gamma_m$) in the set of matrices can be inverted to compute communication link supportability; computing a composite power for each communication beam in the WCDMA communications system based on the aforementioned procedures; and computing the transponder input power ($x_{m,ni}$) for the communication link of interest (i) using the composite power computation.

Embodiments of the invention include a method for computing communication link supportability of a transponder in a WCDMA communications system in a user-to-base direction based on exact performance.

Embodiments of the invention include a method for computing communication link supportability of a transponder in a WCDMA communications system in a user-to-base direction based on a reduced dimension spectral overlap values and one or more sub-beams.

Embodiments of the invention include a method for computing communication link supportability of a transponder in a WCDMA communications system in a user-to-base direction based on one or more sub-beams.

Embodiments of the invention include a method for computing communication link supportability of a transponder in a WCDMA communications system in a base-to-user direction.

Embodiments of the invention include a method for computing communication link supportability of a transponder in a WCDMA communications system that incorporates non-idealities of the transponder and a communication path between the transponder and an access module.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodi

Figure 1:
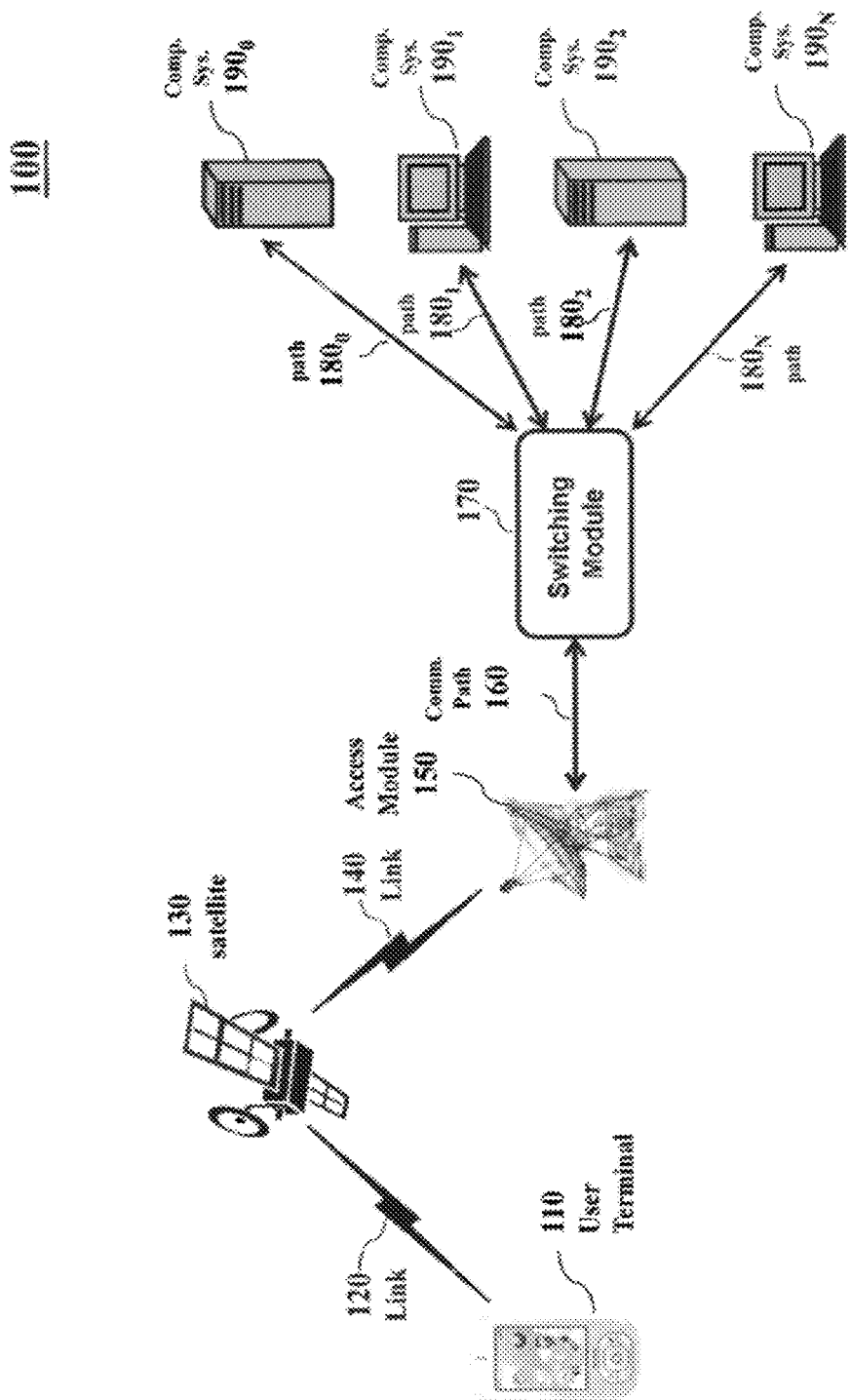
- FIG. 1 is an illustration of an example satellite communications system in which embodiments of the present invention can be implemented

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In the following description, for purposes of explanation, numerous specific details are set forth in order to provide a thorough understanding of embodiments of the present invention. It will be evident, however, to one skilled in the relevant art that embodiments of the present invention can be practiced without these specific details. In other instances, well-known circuits, structures, and techniques are not shown in detail, but rather in a block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the present invention. The phrase "in one embodiment" located in various places in this description does not necessarily refer to the same embodiment.

FIG. 1 is an illustration of an example satellite communications (SATCOM) system 100 in which embodiments of the present invention can be implemented. SATCOM system 100 is based on a WCDMA communications protocol. SATCOM system 100 includes a user terminal 110, a satellite 130, an access module 150, a switching module 170, and computing systems $190_0$-$190_N$. In an embodiment, user terminal 110 can be a portable communications device such as, for example, a two-way radio or a cellular phone. Further, in an embodiment, user terminal 110 can be located in a land-, air-, or water-based vehicle.

Figure 2:
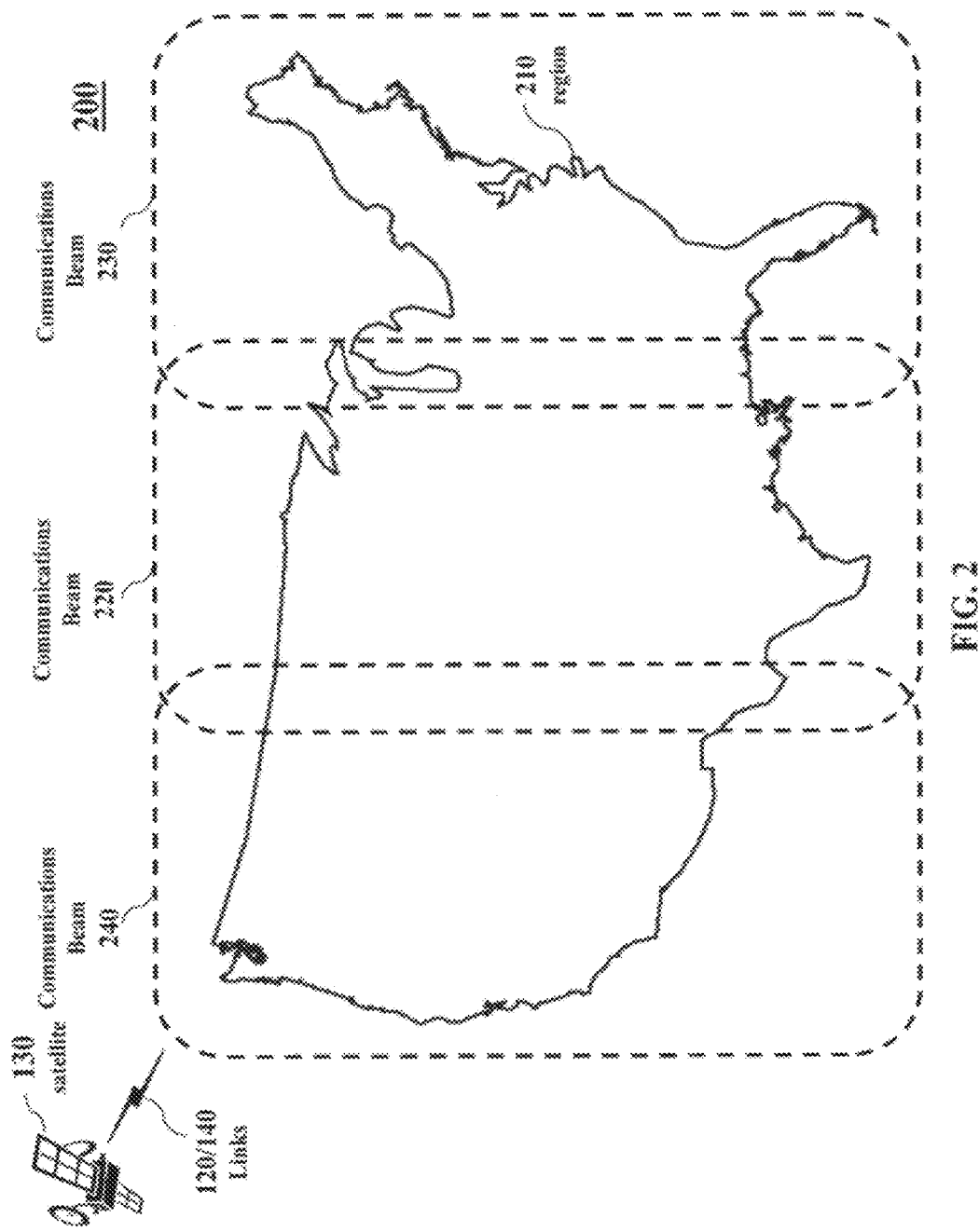
FIG. 2 is an illustration of an example beam coverage for satellite in a satellite communications system over a region.

In an embodiment, satellite 130 can encompass a plurality of communication beams, where the plurality of communication beams can provide satellite communication coverage over a particular region. FIG. 2 is an illustration of an example beam-coverage 200 for satellite 130 over a region 210. In exemplary beam-coverage 200, communication beam 220 can have a more powerful beam than communication beams further away from a center of coverage of region 210 (e.g., communication beams 230 and 240). As such, user terminal 110 can establish a communication link (also referred to herein as a link) with satellite 130 more easily (e.g., with a lower power requirement) in this area of region 210 than areas outside communication beam 220. If user terminal 110 is located in an area outside of communication beam 220 (e.g., areas encompassed by communication beams 230 and 240 that do not include communication beam 220), user terminal 110 may require a more powerful communication link to effectively communicate with satellite 130.

In reference to FIG. 1, user terminal 110 can communicate with access module 150 via satellite 130 and communication links 120 and 140. A communication path from user terminal 110 to satellite 130 can be defined as an "uplink" path (also referred to herein as a "user-to-base" direction or U2B direction). In an embodiment, user terminal 110 can transmit signals to satellite 130 in the U2B direction using an ultra-high frequency (UHF) band. Conversely, a communication path from satellite 130 to user terminal 110 can be defined as a "downlink" path (also referred to herein as a "base-to-user" direction or B2U direction). In an embodiment, satellite 130 can transmit signals to user terminal 110 in the B2U direction using the UHF band.

Satellite 130 communicates with access module 150 via communication link 140. In an embodiment, communication link 140 can use a Ka-band of frequency. Upon receipt of a transmitted signal (e.g., a UHF signal) by user terminal 110 in the U2B direction, satellite 130 can amplify, channelize, and modulate the signal onto a Ka-band carrier prior to relaying the signal to access module 150 according to an embodiment of the present invention. In the B2U direction, satellite 130 can receive a Ka-band signal from access module 150 and convert the Ka-band signal to a frequency compatible with user terminal 110 (e.g., a frequency within the UHF band) according to an embodiment of the present invention. The communication channel used by satellite 130 to receive the signal from user terminal 110, to amplify the signal, and to retransmit the signal on a different frequency can be defined as a transponder. The transponder can also be configured to convert the Ka-band signal (received from access module 150) to a frequency compatible with user terminal 110 and then transmit the converted signal to user terminal 110. Transponders are well known to persons skilled in the relevant art.

Based on the description herein, a person skilled in the relevant art will recognize that other bands of frequency and frequency conversion techniques can be used in SATCOM system 100. These other bands of frequency and frequency conversion techniques are within the scope and spirit of the present invention.

In referring to FIG. 1, access module 150 can receive a communications signal from satellite 130 and transfer the communications signal to switching module 170 via communications path 160. Switching module 170 can transfer the communications signal to one or more computing systems $190_0$-$190_N$ via communication paths $180_0$-$180_N$, respectively, where N represents a number of computing systems associated with system 100. In an embodiment, computing systems $190_0$-$190_N$ can represent a satellite control module, a data center, and a network management facility.

Figure 3:
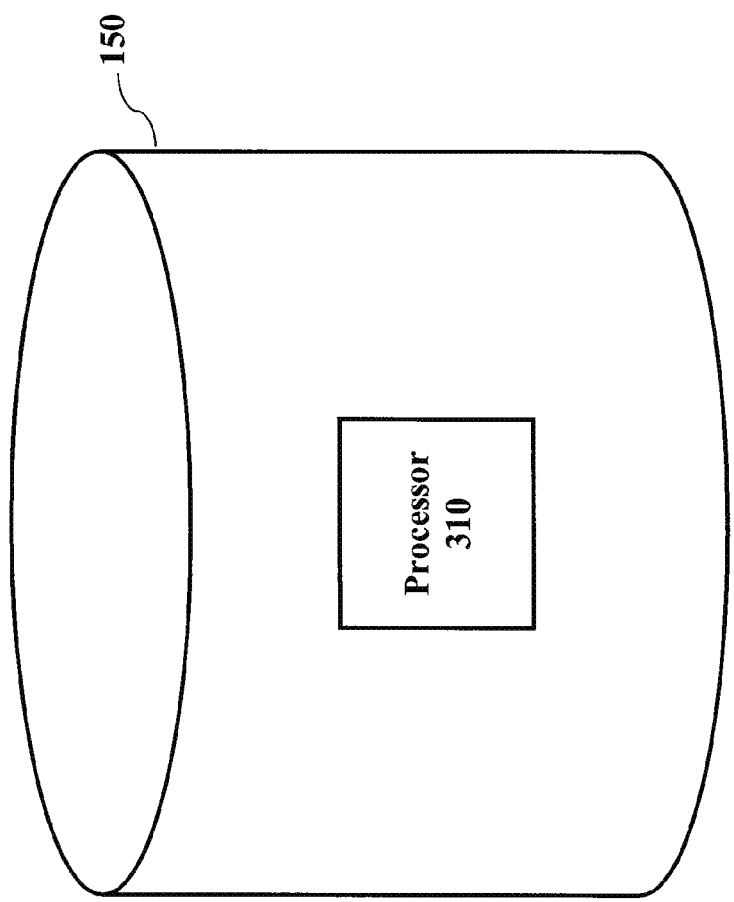
FIG. 3 is an illustration of an embodiment of an access module in a satellite communications system.

FIG. 3. is an illustration of an embodiment of access module 150. Access module 150 can include a processor 310. Processor 310 can execute software to compute link supportability and system capacity for SATCOM system 100. For instance, SATCOM system 100 can be part of a larger satellite communications system (e.g., MUOS) that facilitates communication between a multiple users. The larger satellite communications system can also contain a plurality of communication beams (e.g., communication beams 230 and 240 in FIG. 2), where communication beams from different satellites can overlap to ensure adequate communication coverage. This overlap in communication beams can contribute to multiple access interference (MAI) in the larger satellite communications system. Based on these considerations and other factors further described below, processor 310 can execute software to compute supportability of a communication link of interest in the larger satellite system. The software can provide information on a carrier signal to noise plus interference spectral density for the communication link of interest and on a power of the transponder (e.g., in satellite 130) to support the communication link.

Based on the description herein, a person skilled in the art will recognize that the operations performed by processor 310 can be performed by other modules in SATCOM system 100. For instance, one or more processors in user terminal 110, satellite 130, switching module 170, and/or computing systems $190_0$-$190_N$ can provide information on link supportability.

Further, based on the description herein, a person skilled in the relevant art will recognize that embodiments of the present invention can be implemented in other communication systems that implement the WCDMA communications protocol. To help facilitate in the explanation of embodiments of the present invention, SATCOM system 100 will be referred to below as an example WCDMA communications system in which embodiments of the present invention can be implemented.

Figure 4:
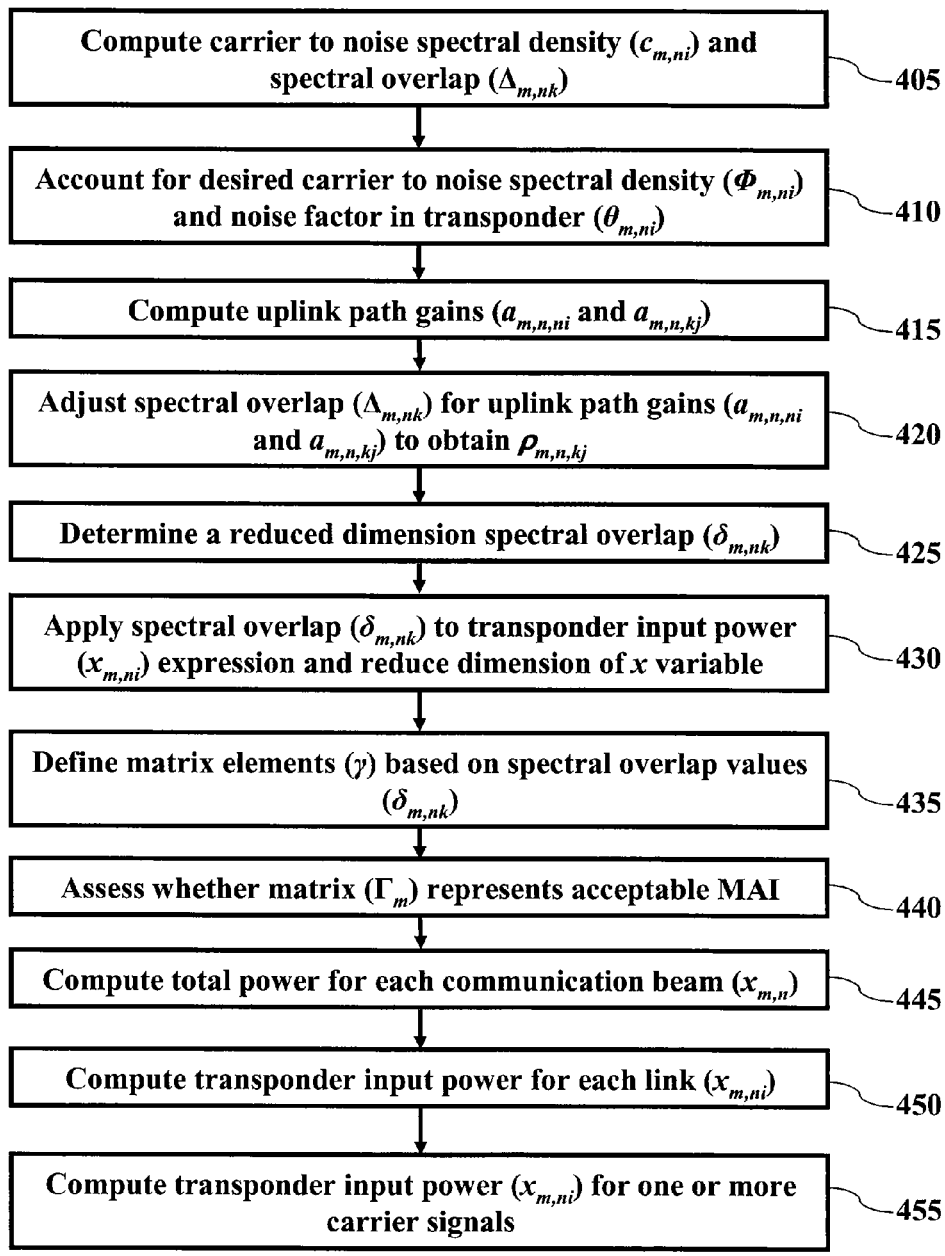
FIG. 4 is an illustration of an embodiment of a method for computing communication link supportability of a transponder in a WCDMA communications system in a user-to-base direction based on bounded or approximate performance.

EMBODIMENTS OF THE PRESENT INVENTION (1) An Embodiment of a Method to Compute Link Supportability in a U2B Direction FIG. 4 is an illustration of an embodiment of a method 400 to compute communication link supportability of a transponder in a WCDMA communications system in a U2B direction based on a bounded or approximate performance. For explanation purposes, method 100 will be described with respect to a satellite communications system (e.g., SATCOM system 100 in FIG. 1).

Method 400 considers link specification parameters for substantially all communication links for substantially all communication beams of the satellite communications system. For instance, the satellite communications system can be a MUOS with an array of satellites developed for SATCOM. An example of a satellite in the array of satellites in the MUOS can be satellite 130 described above with respect to FIG. 1. The array of satellites can facilitate communications over a large region (e.g., region 210 in FIG. 2 or global communications coverage), where the communication beams of each satellite can partially overlap (e.g., to ensure reliable communications coverage between satellite communications regions).

The overlap in communication beams between multiple satellites can complicate the computation of link supportability of a given satellite due to an additional MAI from adjacent communication beams. MAI can take into account a spectral overlap of communication signals as well as differences in various communication beam patterns from frequency reuse. As such, communication issues associated with MAI can be augmented as the number of satellites (and, thus communication beams) increase in satellite communications system.

Method 400 can consider link specification parameters for all communication links and beams of the satellite communications system. Further, method 400 assumes that a communication link between the satellite and an access module (e.g., communication link 140 in FIG. 1) does not have an appreciable effect on the overall link performance and supportability. However, based on the description herein, a person skilled in the relevant art will recognize that the concepts described below can be applied to the communication link between the satellite and the access module.

To facilitate in the explanation of method 400, the following variables will be used:
- p=uplink power of the user terminal;
- x=power at an input of a transponder;
- a=uplink path gain (including antenna gains);
- $T_s$=noise temperature at the satellite input;
- $T_E$=noise temperature of the downlink terminal;
- P=nominal power of the transponder;
- K=Boltzmann's constant; and
- Δ=effective spectral overlap of communication links.

Further, variables 'i' and 'j' will be used to represent communication link indices and variables 'k' and 'n' will be used to represent communication beam indices. Variable n will be used to indicate a communication beam of interest. Variable m will be used to indicate a plurality of communication beams that do not include the communication beam of interest (n) (variable m is also referred to herein as an interfering communication beam).

Variable i will be used to represent a communication link of interest. Variable j is representative of a plurality of communication links that do not include the communication link of interest (i) (variable j is also referred to herein as an interfering communication link). For instance, variable j can represent communication links from all communication beams within the satellite communications system other than the communication link of interest (i). Variable 'm' will be used to represent an index for a carrier signal (e.g., 5 MHz band of interest in a WCDMA communication protocol). In an embodiment, carrier signal m can contain a plurality of communication beams, where each communication beam can contain a plurality of communication links.

Method 400 further assumes that a plurality of communication links can operate simultaneously in a transponder used by the satellite and that any one single link from the plurality of communication links is not relatively large as compared to the composite communication signal. This assumption ensures that a gain compression parameter for each link in the plurality of communication links is substantially equivalent to one another and that any one link from the plurality of communications links is unlikely to be substantially distorted due to factors other than gain compression. Gain compression in relation to transponder communication signals, as described herein, is known to those persons skilled in the relevant art.

(1)(A) Derivation of Variables Used in an Embodiment to Compute Link Supportability Prior to the detailed explanation of method 400, it is important to note that method 400 incorporates a number of variables. Embodiments of a derivation of these variables will be described below.

As a starting point, a power parameter for a communication link of interest in a transponder ($c_i$) can be defined by the following equation:

$$c_i \leq \frac{y_i b_i}{\left(\frac{KT_s G_{m(i)} b_i}{g(z)}\right) + b_i \sum_{j \neq i} \Delta_{ij} y_j + \left(\frac{h(z) P b_i}{B}\right) + KT_{Ei}} \quad (1)$$

The derivation of EQ. 1 can be found in "SATCOM Loading Analysis with Heterogeneous Gain States," by Jim Marshall and Jeffrey Heissler, *IEEE MILCOM* 2002, which is incorporated by reference in its entirety. EQ. 1 considers a power parameter $c_i$ of a communication link of interest (i) and one or more interfering communication links (j) within a particular communication beam. However, EQ. 1 does not take into account MAI from other communication beams that may be used in a satellite communications system.

Based on the power parameter $c_i$ defined in EQ. 1, the effects of communication beams and associated communication links outside the communication link of interest in the U2B direction can be analyzed. In the U2B direction, waveforms are assumed to be compliant with the WCDMA communication protocol and to be non-orthogonal waveforms, which can reduce the performance of the satellite communications system and consequently the number communication links that can be used. Non-orthogonal waveforms compliant with the WCDMA communication protocol are well known to those skilled in the relevant art.

In the U2B direction, the carrier signal to noise spectral density ($c_{m,ni}$) for a communication link of interest (i) can be expressed in terms of a transponder input power for the communication link of interest ($x_{m,ni}$), a spectral overlap factor representative of one or more interfering communication links ($\Delta_{m,nk}$), and a transponder input power of the one or more interfering communication links ($x_{m,n,kj}$). EQ. 2 represents the carrier signal to noise spectral density ($c_{m,ni}$) for a communication link of interest (i) in the U2B direction.

$$c_{m,ni} \leq \frac{x_{m,ni}}{KT_{Sm,n} + \sum_{kj \neq ni} \Delta_{m,nk} x_{m,n,kj}} \quad (2)$$

EQ. 2 is a modification of EQ. 1, where downlink path gain b can be divided through numerator and denominator portions of the equation and EQ. 1 can be corrected for transponder gain and gain compression in order to express the equation relative to a transponder input.

The carrier signal to noise spectral density ($c_{m,ni}$) in EQ. 2 does not take into account (e.g., negligible factors) an intermodulation noise factor and a downlink noise factor of the transponder in the computation of link supportability. Intermodulation noise is represented by h(z) in EQ. 1 and downlink noise represents, for example, a noise factor associated with a communication path from satellite 130 to access module 150 in FIG. 1.

In EQ. 2, a new set of subscripts are defined. For instance, $x_{m,ni}$ represents a transponder input power of the $i^{th}$ communication link in the $n^{th}$ communication beam using the $m^{th}$ carrier. Variable $x_{m,n,kj}$ represents an interfering power from the $j^{th}$ communication link in the $k^{th}$ communication beam that interferes with the $n^{th}$ communication beam using the $m^{th}$ carrier.

Variable $\Delta$ in EQ. 2 represents an effective spectral overlap of a plurality of communication links, which consequently causes MAI, and can be defined as follows:

$$\Delta_{m,nk} = \int S_{m,n}(f) S_{m,k}(f) df \quad (3)$$

$S_{m,n}(f)$ is a power-normalized spectral density of a communication link using the $n^{th}$ beam on the $m^{th}$ carrier. Similarly, $S_{m,k}(f)$ is a power-normalized spectral density of a communication link using the $k^{th}$ beam on the $m^{th}$ carrier. $S_{m,n}(f)$ and $S_{m,k}(f)$ are multiplied with each other and integrated over frequency to generate $\Delta_{m,nk}$. Based on EQs. 2 and 3, as the effective spectral overlap of the plurality of communication links increases, $\Delta_{m,nk}$ increases, thus decreasing the effect of MAI on carrier signal to noise spectral density ($c_{m,ni}$) for a communication link of interest (i).

In an embodiment, the spectral overlap factor ($\Delta_{m,nk}$) can be approximated as a result of notching in the spread spectrum communication signal in the U2B direction. In an embodiment, a square-root raised cosine pulse-shaping function can be used by the transponder to filter the notching in the communication signal. In using the square root raised cosine pulse shaping filter on the communication signal, the effective spectral overlap can be approximated as the following:

$$\Delta_{m,nk} \cong \frac{(1 - \alpha/4)}{[1 - \min(\eta_{m,n}, \eta_{m,k})] R_c} \quad (4)$$

Variable $\alpha$ represents a roll-off factor of the pulse shaping function, $R_c$ represents a chip rate used in a WCDMA communication protocol, and $\eta$ represents a fraction of a notched band used to support an adaptive use of bandwidth in the WCDMA communication protocol. Square-root raised cosine pulse-shaping functions and notching in a spread spectrum communication signal are well known to those skilled in the relevant art.

Power at the output of the user terminal (e.g., user terminal 110 in FIG. 1) can be defined by the following:

$$x_{m,ni} = p_{m,ni} a_{m,n,ni} \quad (5)$$

$$x_{m,kj} = p_{m,kj} a_{m,n,kj} \quad (6)$$

Variable $p_{m,ni}$ represents an uplink power of the user terminal for the $i^{th}$ communication link in the $n^{th}$ beam using the $m^{th}$ carrier. Variable $a_{m,n,ni}$ represents an uplink path gain of the $n^{th}$ communication beam towards the user terminal used by the $i^{th}$ communication link in the $n^{th}$ communication beam using the $m^{th}$ carrier. Variables $p_{m,kj}$ and $a_{m,n,kj}$ have similar subscript notation descriptions as variables $p_{m,ni}$ and $a_{m,n,ni}$, respectively.

Based on EQs. 5 and 6, EQ. 2 can be defined as the following:

$$c_{m,ni} \leq \frac{p_{m,ni} a_{m,n,ni}}{KT_{Sm,n} + \sum_{kj \neq ni} \Delta_{m,nk} p_{m,kj} a_{m,n,kj}} \quad (7)$$

In EQ. 7, the uplink path gains in the numerator and denominator portions of the equation ($a_{m,n,ni}$ and $a_{m,n,kj}$, respectively) have different subscripts. The same path gain ($a_{m,k,kj}$) can be multiplied and divided inside the summation operation in the denominator portion of EQ. 7 as follows:

$$c_{m,ni} \leq \frac{p_{m,ni} a_{m,n,ni}}{KT_{Sm,n} + \sum_{kj \neq ni} \Delta_{m,nk} \left( \frac{a_{m,n,kj} a_{m,k,kj} p_{m,kj}}{a_{m,k,kj}} \right)} \quad (8)$$

In using EQs. 5 and 6, EQ. 8 can be expressed in terms of power at the transponder input by the following equation:

$$x_{m,ni} = c_{m,ni} KT_{Sm,n} + c_{m,ni} \sum_{kj \neq ni} \Delta_{m,nk} \left( \frac{a_{m,n,kj}}{a_{m,k,kj}} \right) x_{m,kj} \quad (9)$$

A new variable ρ can be defined to simplify EQ. 9.

$$\rho_{m,n,kj} \equiv \Delta_{m,nk} \frac{a_{m,n,kj}}{a_{m,k,kj}} \quad (10)$$

In substituting EQ. 10 into EQ. 9, the following simplification can be made:

$$x_{m,ni} = c_{m,ni} KT_{Sm,n} + c_{m,ni} \sum_{kj \neq ni} \rho_{m,n,kj} x_{m,kj} \quad (11)$$

EQ. 10 represents a set of linear equations in the power at the input of the transponder ($x_{m,ni}$). In solving EQ. 11, the set of linear equations can be on the order of $10^4$ dimensions for a satellite communications system (e.g., there can be on the order of $10^4$ communication links). Among its features, method 400 reduces the number of dimensions when computing link supportability of the satellite communications system.

In allowing the summation operation in EQ. 11 to occur for all communication links and subtracting a term that must be excluded from the summation operation (i.e., the term associated with the communication link of interest (i)), the following equation can be derived:

$$x_{m,ni} = c_{m,ni} KT_{Sm,n} + c_{m,ni} \sum_{k} \sum_{j} \rho_{m,n,kj} x_{m,kj} - c_{m,ni} \Delta_{m,nn} x_{m,ni} \quad (12)$$

The term $c_{m,ni} \Delta_{m,nn} x_{m,ni}$ is subtracted from the summation operation on the right side of EQ. 12 since this term is associated with the communication link of interest. Further, from EQ. 10, when n=k, the uplink path gain values ($a_{m,n,kj}$ and $a_{m,k,kj}$) cancel each other, thus simplifying EQ. 10 to $\Delta_{m,nn}$.

In bringing like terms to the left side of EQ. 12, the following equation can be derived:

$$x_{m,ni} = (1 + c_{m,ni} \Delta_{m,nn}) = c_{m,ni} KT_{Sm,n} + c_{m,ni} \sum_{k} \sum_{j} \rho_{m,n,kj} x_{m,kj} \quad (13)$$

Further, in dividing the left and right sides of the equation by the quantity on the left side of EQ. 13 and defining new variables, the following equation can be derived:

$$x_{m,ni} = \theta_{m,ni} + \phi_{m,ni} \sum_{k} \sum_{j} \rho_{m,n,kj} x_{m,kj} \quad (14)$$

where $$\phi_{m,ni} \equiv \frac{c_{m,ni}}{1 + c_{m,ni} \Delta_{m,nn}} \quad (15)$$

$$\theta_{m,ni} \equiv \phi_{m,ni} KT_{Sm,n} \quad (16)$$

In an embodiment, reduced dimension spectral overlap values ($\delta_{m,nk}$) can be defined for a factor related to the approximation of the spectral overlap factor ($\Delta_{m,nk}$) and uplink path gains of one or more communication beams ($a_{m,n,kj}$ and $a_{m,k,kj}$), where the one or more communication beams contain the communication link of interest (i) and the one or more interfering communication links (j). EQ. 17 can facilitate a reduction of dimensions by defining a reduced dimension spectral overlap values for ρ.

$$\delta_{m,nk} \equiv \frac{1}{\sum_{j} \phi_{m,kj}} \left( \sum_{j} \phi_{m,kj} \rho_{m,n,kj} \right) \quad (17)$$

EQ. 17 can be used as an approximation for ρ in EQ. 14. This approximation for ρ can be accurate within 1% when computing communication link powers.

In an another embodiment, the reduced dimension spectral overlap values ($\delta_{m,nk}$) can be defined in relation to a maximum bound performance due to an interfering communication link (j). A worst-case parameter to represent a variation in the value of $\rho_{m,n,kj}$ is defined in EQ. 18.

$$\delta_{m,nk} \equiv \max_{j} (\rho_{m,n,kj}) \quad (18)$$

The reduced dimension spectral overlap values ($\delta_{m,nk}$) from EQs. 17 and 18 can be applied to the expression of EQ. 14, which defines the transponder input power for the communication link of interest ($x_{m,ni}$). More specifically, in applying EQs. 17 and 18 to EQ. 14, the following approximation can be derived:

$$x_{m,ni} \cong \theta_{m,ni} + \phi_{m,ni} \sum_{k} \delta_{m,nk} \sum_{j} x_{m,kj} = \theta_{m,ni} + \phi_{m,ni} \sum_{k} \delta_{m,nk} x_{m,k} \quad (19)$$

A dimensionality of the computation of the transponder input power (in EQ. 19) can be reduced by summing both sides of the expression in EQ. 19 over a plurality of communication links in the one or more communication beams. In an embodiment, both right and left sides of EQ. 19 can be summed over all communication links in each communication beam of the satellite communications system to reduce the dimensionality of the computation of variable $x_{m,ni}$. EQ. 20 shows the result of the reduction in dimensionality of variable $x_{m,ni}$, which represents the transponder input power for the communication beam of interest.

$$x_{m,n} \cong \theta_{m,n} + \phi_{m,n} \sum_k \delta_{m,nk} x_{m,k} \quad (20)$$

The expression defining the transponder input power for communication beam of interest ($x_{m,n}$), in EQ. 20, can be converted to a set of vector equations for one or more carrier signals used in the transponder. In particular, EQ. 20 can be converted to the following:

$$\vec{x}_m \cong \vec{\theta}_m + \Gamma_m \vec{x}_m \quad (21)$$

From EQ. 21, m different $\Gamma$ matrices exist, where m is the number of carrier signals and the elements of each $\Gamma_m$ matrix are defined by the following:

$$\gamma_{m,nk} = \phi_{m,nk} \delta_{m,nk} \quad (22)$$

In bringing like terms of EQ. 19 to the left side of the equation, the following equation can be derived:

$$(I - \Gamma_m) \vec{x}_m \cong \vec{\theta}_m \quad (23)$$

In EQ. 23, I represents an identity matrix, which is well known by those persons skilled in the relevant art. EQ. 23 can be further solved as the following approximation:

$$\vec{x}_m \cong (I - \Gamma_m)^{-1} \vec{\theta}_m \quad (24)$$

From EQ. 24, there are m matrices to be inverted, where each matrix has a dimensionality of $B_m \times B_m$, where $B_m$ represents a number of communication beams using the mth carrier signal.

(1)(B) An Embodiment of a Method to Compute Link Supportability

Based on the derivations of the variables above, method 400 will be described in further detail below. Method 400, as noted above, can be used to compute communication link supportability of a transponder in a WCDMA communications system in a U2B direction based on a bounded or approximate performance.

In referring to method 400 in FIG. 4, step 405 computes a carrier to noise spectral density for a communication link of interest ($c_{m,ni}$) and a spectral overlap of a plurality of communication links ($\Delta_{m,nk}$). In an embodiment, the carrier to noise spectral density ($c_{m,ni}$) and the spectral overlap of the plurality of communication links ($\Delta_{m,nk}$) are defined above with respect to EQs. 2 and 4, respectively.

Step 410 accounts for a desired carrier to noise spectral density for the communication link of interest ($\phi_{m,ni}$) and a noise factor in the transponder ($\theta_{m,ni}$) based on the desired carrier to noise spectral density ($\phi_{m,ni}$). In an embodiment, the desired carrier to noise spectral density ($\phi_{m,ni}$) and the noise factor in the transponder ($\theta_{m,ni}$) are defined above with respect to EQs. 15 and 16, respectively.

Step 415 computes an uplink path gain for the communication link of interest ($a_{m,n,ni}$) and for one or more interfering communication links ($a_{m,n,kj}$).

Step 420 adjusts the spectral overlap of the plurality of communication links ($\Delta_{m,nk}$) for uplink path gains from a plurality of communication beams ($a_{m,n,ni}$ and $a_{m,n,kj}$). In an embodiment, the adjusted spectral overlap ($\rho_{m,k,kj}$) is defined by EQ. 10.

Step 425 defines a reduced dimension spectral overlap values ($\delta_{m,nk}$) based on the adjusted spectral overlap ($\rho_{m,k,kj}$) of the plurality of communication beams. In an embodiment, the reduced dimension spectral overlap values ($\delta_{m,nk}$) are defined by EQ. 17. In another embodiment, the reduced dimension spectral overlap values ($\delta_{m,nk}$) are defined by EQ. 18.

Step 430 applies the reduced dimension spectral overlap values ($\delta_{m,nk}$) to an expression that defines a transponder input power ($x_{m,ni}$) for a communication beam of interest (n). In an embodiment, the expression defining the transponder input power ($x_{m,ni}$) is defined by EQ. 14. Further, EQ. 20 defines an approximation of the resulting equation after applying the reduced dimension spectral overlap values ($\delta_{m,nk}$) to the transponder input power ($x_{m,ni}$) expression, allowing the dimensionality of the problem to be reduced as in EQ. 20 and 21. The calculation of the transponder input power ($x_{m,ni}$) in step 430 can be expressed as a set matrices, where each matrix ($\Gamma_m$) in the set of matrices contains a plurality of matrix elements ($\gamma$). In an embodiment, a set of vector equations representative of the set of matrices can be defined by EQ. 21.

In step 435 of method 400, each matrix element ($\gamma$) of each matrix ($\Gamma_m$) in the set of matrices (from step 430) is based on the reduced dimension spectral overlap values ($\delta_{m,nk}$). In an embodiment, EQ. 22 defines the matrix elements of each matrix.

In step 440, each matrix ($\Gamma_m$) in the set of matrices is assessed whether multiple access interference (MAI) is acceptable. In an embodiment, EQ. 24 defines an inversion of each matrix ($\Gamma_m$) in the set of matrices. In solving EQ. 24, if any of the matrices are singular or if any of the matrix elements in any of the inverted matrices are negative then this is an indication that MAI is too great to support the communication links of interest. In an embodiment, if MAI is too great for link supportability, the number of active communication links or the communication link data rates may need to be reduced.

Step 445 computes a composite power for each communication beam in the WCDMA communications system based on steps 405-440. In an embodiment, the resulting values from EQ. 24 represent the composite uplink powers for the communication links measured at the input of the transponder and aggregated over each communication beam.

In step 450, the transponder input power ($x_{m,ni}$) for the communication link of interest (i) is computed using the composite power computation in step 445. In an embodiment, vector components from these resulting values in EQ. 24 (from step 445) are used to represent $x_{m,k}$ quantities, which can be substituted into the summation operation of EQ. 19. Accordingly, individual communication link powers for all communication links in all communication beams in the satellite communications system can be calculated.

Step 455 performs steps 405-450 for one or more carrier signals in the WCDMA communications system.

Figure 5:
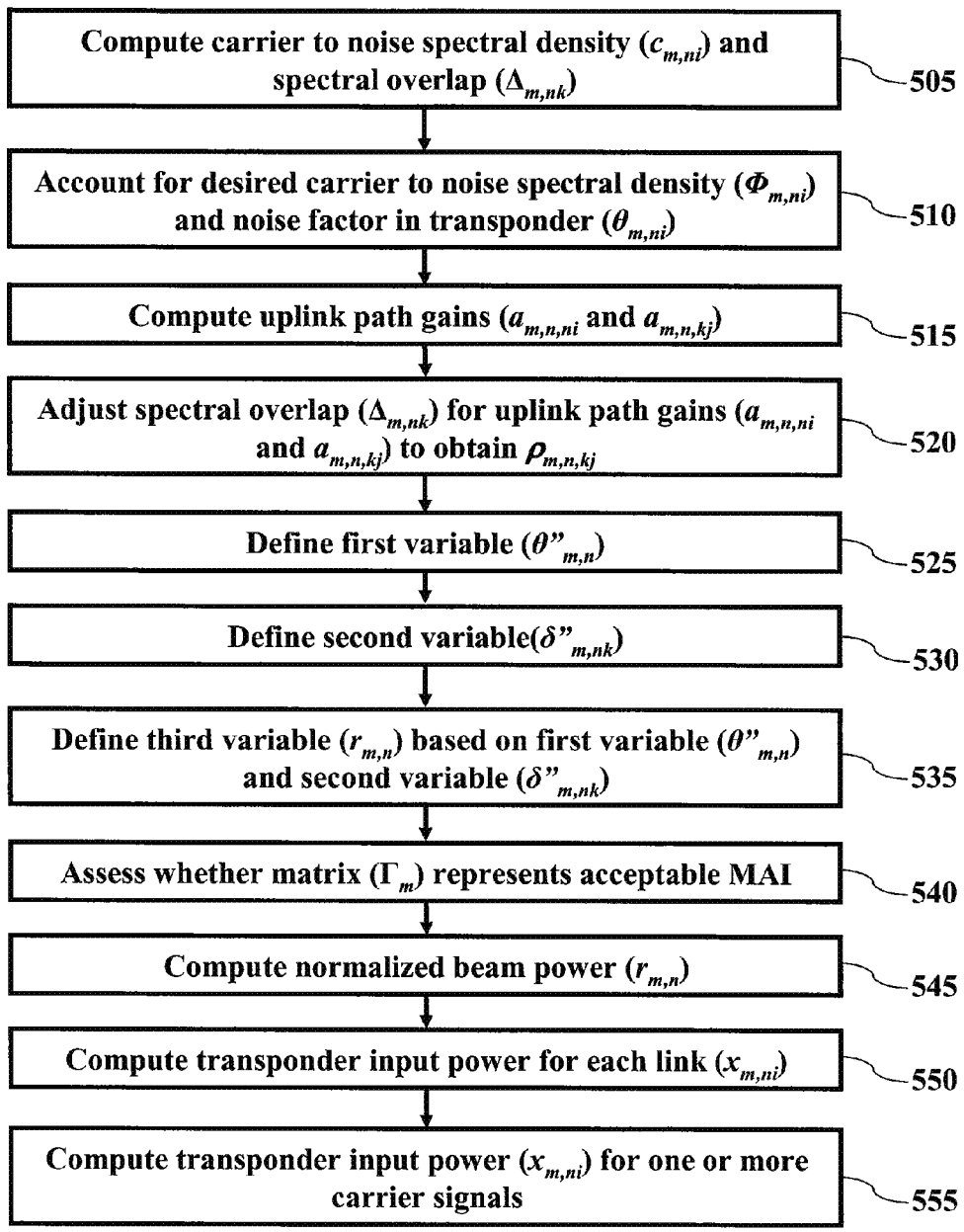
FIG. 5 is an illustration of an embodiment of a method for computing communication link supportability of a transponder in a WCDMA communications system in a user-to-base direction based on exact performance.

(2) Another Embodiment of a Method to Compute Link Supportability in a U2B Direction FIG. 5 is an illustration of another embodiment of a method 500 to compute communication link supportability of a transponder in a WCDMA communications system in a U2B direction. Embodiments of the derivation of variables used in method 500 will first be described, followed by a detailed description of method 500.

(2)(A) Derivation of Variables Used in an Embodiment to Compute Link Supportability The derivation of variables used in the explanation of method 500 is similar to the variables derived above with respect to method 400. Here, EQ. 14 can be used as a starting point to derive additional variables used in method 500. Similar to EQs. 12-16 described above with respect to method, EQ. 14 can be defined in terms of $\phi$ and $\theta$.

$$x_{m,ni} = \theta_{m,ni} + \phi_{m,ni} \sum_k \sum_j \rho_{m,n,kj} x_{m,kj} \qquad (25)$$

A new variable r can be defined as follows:

$$r_{m,ni} \equiv \frac{x_{m,ni} - \theta_{m,ni}}{\phi_{m,ni}} \qquad (26)$$

With this definition for r in EQ. 26, EQ. 14 can be written as the following:

$$x_{m,ni} = \theta_{m,ni} + \phi_{m,ni} r_{m,ni} \qquad (27)$$

In applying EQs. 27 to EQ. 25, variable r can be expressed as follows:

$$r_{m,ni} = \sum_k \sum_j \rho_{m,n,kj}(\theta_{m,kj} + \phi_{m,kj} r_{m,kj}) \qquad (28)$$

The right side of EQ. 28 does not depend on the communication link of interest (i) and, as such, subscript (i) can be dropped from the left side of EQ. 28. Therefore, variable r does not depend on any individual communication link. Variable r depends only on the communication beam (e.g., k and n communication beams). Hence, the variable representative of one or more interfering communication links (j) can be dropped from the right side of EQ. 28. In dropping subscripts i and j from EQ. 28, variable r can be defined as follows:

$$r_{m,n} = r_{m,ni}; \forall i \qquad (29)$$

Thus, EQ. 28 can be rewritten as follows:

$$r_{m,n} = \sum_k \sum_j \rho_{m,n,kj}(\theta_{m,kj} + \phi_{m,kj} r_{m,k}) \qquad (30)$$

The summation operation on the right side of EQ. 30 can be split into two summation terms, where variable r can be moved outside the inner sum in the second summation term.

$$r_{m,n} = \sum_k \sum_j \rho_{m,n,kj} \theta_{m,kj} + \sum_k r_{m,k} \sum_j \rho_{m,n,kj} \phi_{m,kj} \qquad (31)$$

Two additional variables are defined below to facilitate in the computation of EQ. 31.

$$\theta''_{m,n} = \sum_k \sum_j \rho_{m,n,kj} \theta_{m,kj} \qquad (32)$$

$$\delta''_{m,nk} = \sum_j \rho_{m,n,kj} \phi_{m,kj} \qquad (33)$$

Based on EQs. 32 and 33, EQ. 31 can be written as follows:

$$r_{m,n} = \theta''_{m,n} + \sum_k \delta''_{m,nk} r_{m,k} \qquad (34)$$

Similar to EQ. 20, EQ. 34 represents a set of linear equations that can be solved in a similar manner described above with respect to EQs. 21-24 in method 400. Variable $r_{m,n}$ represents a normalized beam power. After r is solved for the communication beam of interest (n), this value can be used in EQ. 27 to solve for power at the input of the transponder for each individual communication link ($x_{m,ni}$).

(2)(B) An Embodiment of a Method to Compute Link Supportability

Based on the derivation of the variables above, method 500 will be described in further detail below. Method 500, as noted above, can be used to compute communication link supportability of a transponder in a WCDMA communications system in a U2B direction.

In referring to method 500 in FIG. 5, steps 505-520 are similar to steps 405-420, respectively, described above with respect to method 400.

In particular, step 505 computes a carrier to noise spectral density for a communication link of interest ($c_{m,ni}$) and a spectral overlap of a plurality of communication links ($\Delta_{m,nk}$). Step 510 accounts for a desired carrier to noise spectral density for the communication link of interest ($\phi_{m,ni}$) and a noise factor in the transponder ($\theta_{m,ni}$) based on the desired carrier to noise spectral density ($\phi_{m,ni}$). Step 515 computes an uplink path gain for the communication link of interest ($a_{m,n,ni}$) and for one or more interfering communication links ($a_{m,n,kj}$). Further, step 520 adjusts the spectral overlap of the plurality of communication links ($\Delta_{m,nk}$) for uplink path gains from a plurality of communication beams ($a_{m,n,ni}$ and $a_{m,n,kj}$) to obtain $\rho_{m,n,kj}$.

Step 525 defines a first variable ($\theta''_{m,n}$) representative of a first multiplication of an adjusted spectral overlap factor ($\rho_{m,kj}$) and a noise factor ($\theta_{m,kj}$) in the transponder. In an embodiment, EQ. 32 defines the first multiplication operation, where the first multiplication operation is summed over one or more interfering communication beams (k) and one or more interfering communication links (j).

Step 530 defines a second variable ($\delta''_{m,nk}$) representative of a second multiplication of the adjusted spectral overlap factor ($\rho_{m,n,kj}$) and the desired carrier to noise spectral density ($\phi_{m,kj}$) for the communication link of interest (i). In an embodiment, EQ. 33 defines the second multiplication operation, where the second multiplication operation is summed over the one or more interfering communication links (j).

Step 535 defines a third variable ($r_{m,n}$) representative of a relationship between the first variable ($\theta''_{m,n}$) and the second variable ($\delta''_{m,nk}$). In an embodiment, EQ. 34 defines the third variable. As noted above, EQ. 34 represent a set of linear equations. Similar to $x_{m,n}$ in EQ. 20 above, variable $r_{m,n}$ can be computed based on a set of matrices, where each matrix ($\Gamma_m$) contains a plurality of matrix elements ($\gamma$). In an embodiment, the plurality of matrix elements can be defined as equivalent to the second variable ($\delta''_{m,nk}$).

Step 540 assesses whether each matrix ($\Gamma_m$) in the set of matrices (from step 535) represents an acceptable MAI. This can be determined by evaluating whether each matrix can be inverted and whether any element in each respective inverted matrix is negative. In an embodiment, an inversion of each matrix ($\Gamma_m$) in the set of matrices can be defined in a similar manner as EQ. 24 above. In an embodiment, if any of the matrices are singular or if any matrix element in the inverted matrix is negative, then this is an indication that MAI is too great to support the communication link of interest (i). In an embodiment, if MAI is too great for link supportability, a number of active communication links or communication link data rates may need to be reduced.

Step 545 computes a composite power for each communication beam in the WCDMA communications system based on steps 505-540. In an embodiment, the resulting values from EQ. 34 represent the composite uplink powers for the communication links measured at the input of the transponder and aggregated over each communication beam.

Step 550 uses the composite power computation in step 545 to calculate the transponder input power ($x_{m,n}$) for the communication link of interest (i). In an embodiment, vector components from these resulting values in EQ. 34 (from step 445) are used to represent $r_{m,n}$ quantities, which can be substituted into EQ. 27. Accordingly, individual communication link powers for all communication links in all communication beams in the satellite communications system can be calculated.

Step 555 performs steps 505-550 for one or more carrier signals in the WCDMA communications system.

Figure 6:
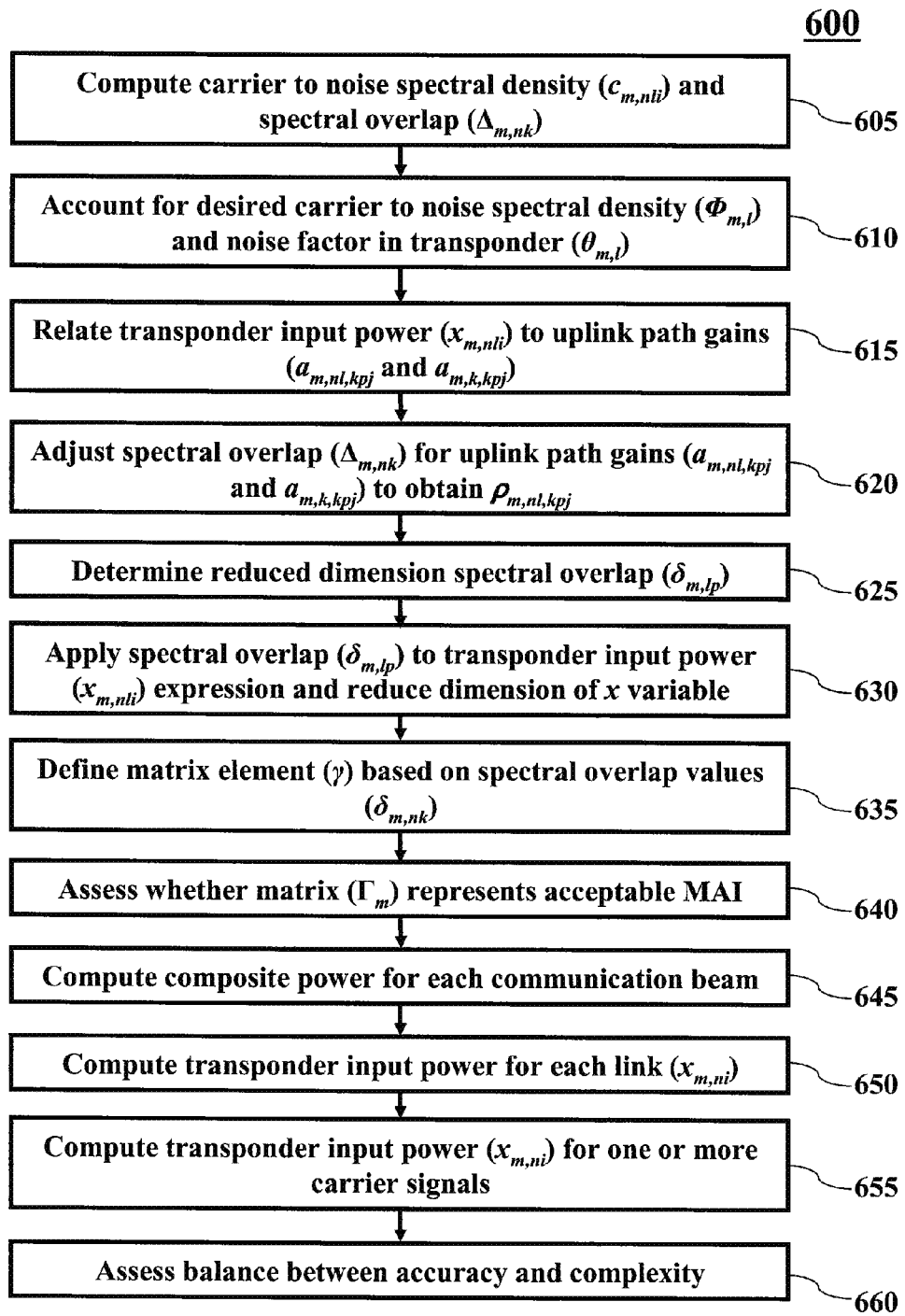
FIG. 6 is an illustration of an embodiment of a method for computing communication link supportability of a transponder in a WCDMA communications system in a user-to-base direction based on a reduced dimension spectral overlap values and one or more sub-beams.

(3) An Embodiment of a Method to Compute Link Supportability in a U2B Direction Based on One or More Sub-Beams FIG. 6 is an illustration of an embodiment of a method 600 to compute communication link supportability of a transponder in a WCDMA communications system in a U2B direction based on a reduced dimension spectral overlap values and one or more sub-beams. As described above with respect to methods 400 and 500, the uplink path gain values ($a_{m,n,kj}$ and $a_{m,k,kj}$) are dependent on individual communication links. Rather than compute the uplink path gain values for each communication link, method 600 uses a sub-beam factor to represent an uplink path gain for one or more communication links to reduce complexity of the computation for communication link supportability.

The sub-beam concept assumes that communication links that are near to one another (e.g., adjacent to each other) have substantially similar uplink path gain values. In an embodiment, the sub-beam can represent the uplink path gain for a plurality of communication links within a particular communication beam. For instance, in a satellite communications system, a geographical region can be divided into communication beam areas (e.g., communication beams 220-240 in FIG. 2) based on antenna patterns of the satellite (e.g., satellite 130 in FIG. 1). A sub-beam can be a portion of a communication beam area that has relatively constant uplink path gain for one or more communication beams in an area of interest. As such, one or more communication beams can be divided into a number of sub-beams. In an embodiment, the sub-beam can represent the up-link path gain for a plurality of communication links across a plurality of communication beams. However, as described below, a large number of sub-beams can provide better optimality in the computation of input power of the transponder, but can also result in a more challenging capacity algorithm.

(3)(A) Derivation of Variables Used in an Embodiment to Compute Link Supportability The derivation of variables used in the explanation of method 600 is similar to the variables derived above with respect to method 400. As a person skilled in the relevant art will recognize, the derivation of the variables used in method 600 is similar to those variables derived above with respect to method 400 with the addition of one or more sub-beam factors (e.g., annotated with subscripts l and p).

The transponder input power ($x_{m,nli}$) can be related to uplink path gain values that take into account sub-beams of a communication beam of interest ($a_{m,nl,kpj}$) and one or more interfering communication beams ($a_{m,kp,kpj}$). Here, EQ. 9 can be used as a starting point to introduce the concept of a sub-beam, as defined in EQ. 35.

$$x_{m,nli} = c_{m,nli} KT_{Sm,n} + c_{m,nli} \sum_{kpj \neq nli} \Delta_{m,nk} \left( \frac{a_{m,nl,kpj}}{a_{m,kp,kpj}} \right) x_{m,kpj} \quad (35)$$

In EQ. 35, $x_{m,nli}$ represents power at the input of the transponder from the $i^{th}$ communication link in the $l^{th}$ sub-beam, which is in the $n^{th}$ beam that uses the $m^{th}$ carrier. Also, $a_{m,nl,kpj}$ represents an uplink path gain of the $l^{th}$ sub-beam of the $n^{th}$ communication beam in a direction of the $j^{th}$ communication link in the $p^{th}$ sub-beam of the $k^{th}$ communication beam. As noted by the subscripts, all variables in EQ. 24 use the $m^{th}$ carrier.

A new variable ρ can be defined to simplify EQ. 35.

$$\rho_{m,nl,kpj} \equiv \Delta_{m,nk} \frac{a_{m,nl,kpj}}{a_{m,kp,kpj}} \quad (36)$$

From EQ. 36, when n=k and l=p, the uplink gain path factors ($a_{m,nl,kpj}$ and $a_{m,kp,kpj}$) cancel each other, thus simplifying EQ. 36 to $\Delta_{m,nn}$ under these conditions. Further, when path gain includes consideration of beam combining, the uplink gain path factor $a_{m,nl,kpj}$ can be computed as the following:

$$a_{m,nl,kpj} = \frac{G_{kpj} \bar{z}_{nl} Q_{kpj} z_{nl}}{L_{kpj}} \quad (37)$$

Here, vectors and matrices are represented as bold variables and $z_{nl}$ represents a set of beam weights for the $l^{th}$ sub-beam in the $n^{th}$ communication beam. $Q_{kpj}$ represents an uplink gain path matrix for substantially all beams in a direction of communication link j that is nominally in sub-beam p, which is in communication beam k. Further, $G_{kpj}$ represents an uplink antenna gain of a user terminal kpj (e.g., user terminal 110 in FIG. 1) in a direction of a satellite (e.g., satellite 130 in FIG. 1). Further, $L_{kpj}$ represents a path loss from the user terminal to the satellite.

A noise term $N_{m,nl}$ from the uplink path gain factors ($a_{m,nl,kpj}$ and $a_{m,kp,kpj}$) into each sub-beam can be defined. In applying EQ. 36 to EQ. 35, the following equation can be derived:

$$x_{m,nli} = c_{m,nli} N_{m,nl} + c_{m,nli} \sum_{kpj \neq nli} \rho_{m,nl,kpj} x_{m,kpj} \quad (38)$$

In addition to substituting the ρ term within the summation operation, EQ. 38 also takes into consideration the noise term $N_{m,nl}$. Noise term $N_{m,nl}$ is used in the computation for each sub-beam and can be defined as follows:

$$N_{m,nl} = \bar{z}_{nl} N_m z_{nl} \quad (39)$$

The $N_m$ matrix is diagonal, with elements that represent noise density in each communication beam. Methods to determine preferable beam-weights for a given set of links and known interference are known to those persons skilled in the relevant art. EQ. 38 is a set of linear equations in x, where the power at the input of the transponder with sub-beams is taken into account.

Similar to EQs. 12-16 described above with respect to method 400, EQ. 38 can be simplified to provide the following equation:

$$x_{m,nli} = \theta_{m,nli} + \phi_{m,nli} = \sum_k \sum_p \sum_j \rho_{m,nl,kpj} x_{m,kpj} \quad (40)$$

Variables $\phi$ and $\theta$ are defined above in EQs. 15 and 16, respectively.

Similar to EQ. 17, a reduced dimension spectral overlap values ($\delta_{m,nlk}$) can be defined for a factor related to the approximation of the spectral overlap factor ($\Delta_{m,nk}$) and uplink path gains of one or more communication beams ($a_{m,nl,kj}$ and $a_{m,kp,kj}$), where the one or more communication beams contain the communication link of interest (i) and the one or more interfering communication links (j). EQ. 41 can facilitate a reduction of dimensions by defining a reduced dimension spectral overlap values for $\rho$.

$$\delta_{m,lp} \equiv \frac{1}{\sum_j \phi_{m,kpj}} \left( \sum_j \phi_{m,kpj} \rho_{m,nl,kpj} \right) \quad (41)$$

EQ. 41 can be used as an approximation for $\rho$ in EQ. 40.

In an another embodiment, the reduced dimension spectral overlap values factor ($\delta_{m,lp}$) can be defined in relation to a maximum bound performance due to an interfering communication link (j). A worst-case parameter to represent a variation in the value of $\rho_{m,n,kj}$ is defined in EQ. 42.

$$\delta_{m,lp} \equiv \max_j (\rho_{m,nl,kpj}) \quad (42)$$

The reduced dimension spectral overlap values of $\delta$ from EQs. 41 and 42 can be applied to the expression of EQ. 40, which defines the transponder input power for the communication link of interest ($x_{m,nli}$). Similar to the derivation of EQ. 19 above with respect to method 400, EQ. 43 shows the result of a reduction in dimensionality of variable $x_{m,nli}$, which represents the transponder input power for the communication sub-beam of interest.

$$x_{m,l} \cong \theta_{m,l} + \phi_{m,l} \sum_k \delta_{m,lp} x_{m,p} \quad (43)$$

Similar to EQs. 21-24 above with respect to method 400, EQ. 43 can be converted to a set of vector equations for one or more carrier signals used in the transponder and solved accordingly.

(3)(B) An Embodiment of a Method to Compute Link Supportability Based on One or More Sub-Beams Based on the derivations of the variables above, method 600 will be described in further detail below. Method 600, as noted above, can be used to compute link supportability of a transponder in a WCDMA communications system in a U2B direction based on a bounded or approximate performance for one or more sub-beams.

In referring to method 600 in FIG. 6, steps 605 and 610 are similar to steps 405 and 410, respectively, described above with respect to method 400.

In particular, step 605 computes a carrier to noise spectral density for a communication link of interest ($c_{m,nli}$) and a spectral overlap of a plurality of communication links ($\Delta_{m,nk}$). Step 610 accounts for a desired carrier to noise spectral density for the communication link of interest ($\phi_{m,l}$) and a noise factor in the transponder ($\theta_{m,l}$) based on the desired carrier to noise spectral density ($\phi_{m,l}$).

Step 615 relates a transponder input power ($x_{m,nli}$) to uplink path gain values ($a_{m,nl,kpj}$ and $a_{m,kp,kpj}$). In an embodiment, the uplink path gain values account for one or more sub-beams associated with a communication beam of interest ($a_{m,nl,kpj}$) and one or more interfering communication beams ($a_{m,kp,kpj}$). In an embodiment, EQ. 35 is used to define the relationship between the transponder input power ($x_{m,nli}$) and the uplink path gain values ($a_{m,nl,kpj}$) and ($a_{m,kp,kpj}$).

Step 620 adjusts the spectral overlap of the plurality of communication links ($\Delta_{m,nk}$) for uplink path gains from a plurality of communication beams ($a_{m,nl,kpj}$ and $a_{m,kp,kpj}$). In an embodiment, the adjusted spectral overlap ($\rho_{m,nl,kpj}$) is defined by EQ. 36.

Steps 625-655 are similar to steps 425-455, respectively, described above with respect to method 400.

In particular, step 625 defines the reduced dimension spectral overlap values ($\delta_{m,lp}$) based on the adjusted spectral overlap ($\rho_{m,nl,kpj}$) of the plurality of communication beams and using EQs. 41 or 42. Step 630 applies the reduced dimension spectral overlap values ($\delta_{m,lp}$) to an expression that defines the transponder input power ($x_{m,nli}$) for a communication beam of interest (n). In step 635, each matrix element ($\gamma$) of each matrix ($\Gamma_m$) in the set of matrices (from step 630) is based on the reduced dimension spectral overlap values ($\delta_{m,lp}$). In step 640, an acceptable MAI is assessed, where each matrix ($\Gamma_m$) in the set of matrices is assessed whether it can be inverted to compute link supportability. Step 645 computes a composite power for each communication beam in the WCDMA communications system based on steps 605-640. In step 650, the transponder input power ($x_{m,nli}$) for the communication link of interest (i) is computed using the composite power computation in step 645. Step 655 performs steps 605-650 for one or more carrier signals in the WCDMA communications system.

Step 660 assesses an optimal balance between accuracy in the computation of power at the input of the transponder ($x_{m,nli}$) and complexity of the computation. Based on the description above, the dimensionality of the computation is equal to the number sub-beams, which is less than or equal to the total number of communication links but more than the number of communication beams. An increase in the number of sub-beams (e.g., smaller groupings of communication links within each sub-beam) can lead to a more accurate calculation of power at the input of the transponder, thus optimally assessing resource allocation to all communication links in the satellite communications system (e.g., MUOS). However, the increase in the number of sub-beams increases the complexity of the analysis.

The number of communication links grouped into a sub-beam is design specific and the calculation of the number of communication links can be an iterative process. In an embodiment, the power level for each link can be calculated using, for example, method 400. From this power information of each communication link, the number of communication links grouped into a sub-beam can be assessed for accuracy and complexity considerations as described above with respect to step 660.

Figure 7:
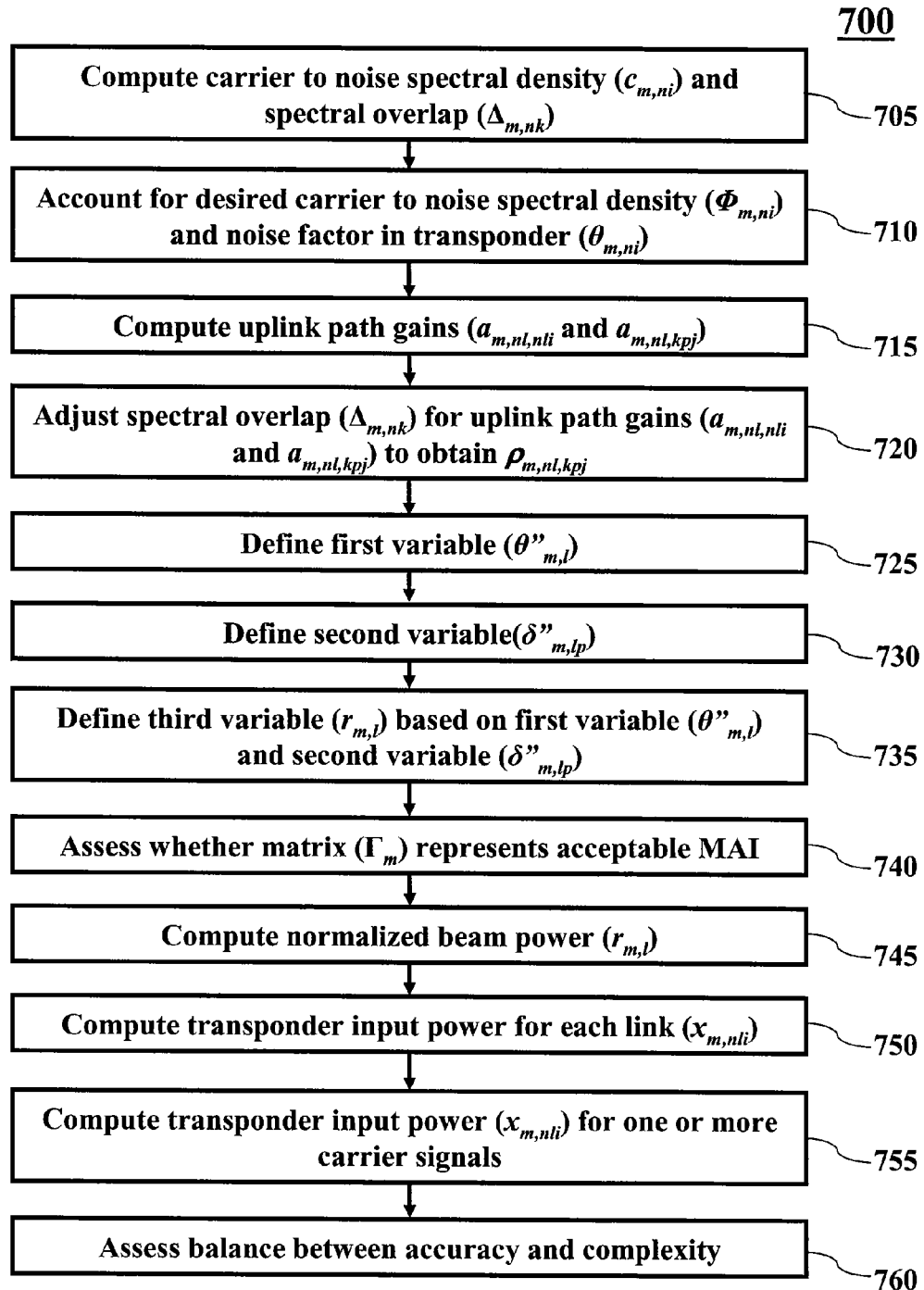
FIG. 7 is an illustration of an embodiment of a method for computing communication link supportability of a transponder in a WCDMA communications system in a user-to-base direction based on one or more sub-beams.

(4) Another Embodiment of a Method to Compute Link Supportability in a U2B Direction Based on One or More Sub-Beams FIG. 7 is an illustration of another embodiment of a method 700 to compute communication link supportability of a transponder in a WCDMA communications system in a U2B direction based on one or more sub-beams. Embodiments of the derivation of variables used in method 700 will first be described, followed by a detailed description of method 700.

(4)(A) Derivation of Variables Used in an Embodiment to Compute Link Supportability The derivation of variables used in the explanation of method 700 is similar to the variables derived above with respect to method 500. A person skilled in the relevant art will recognize that the derivation of variables used in method 700 is similar to those variables derived above with respect to method 500 with the addition of one or more sub-beam factors (e.g., annotated with subscripts l and p).

EQ. 40 can be used as a starting point for the derivation of variables used in method 700. To facilitate in the computation of EQ. 40, a new variable r can be defined.

$$r_{m,nli} \equiv \frac{x_{m,nli} - \theta_{m,nli}}{\phi_{m,nli}} \quad (44)$$

With EQ. 44, EQ. 40 can be defined as the following:

$$x_{m,nli} = \theta_{m,nli} + \phi_{m,nli} r_{m,nli} \quad (45)$$

The dependency of the transponder input power (x) on a plurality of communication links (i and j) can be removed. More specifically, in applying EQs. 44 and 45 to EQ. 40, the following can be defined:

$$r_{m,nli} = \sum_k \sum_p \sum_j \rho_{m,nl,kpj}(\theta_{m,kpj} + \phi_{m,kpj} r_{m,kpj}) \quad (46)$$

The right side of EQ. 46 does not depend on the communication link of interest (i) and, as such, subscript (i) can be dropped from the left side of EQ. 46. Therefore, variable r does not depend on any individual communication link. Variable r depends only on the communication beam (e.g., k and n communication beams) and sub-beams (e.g., l and p sub-beams). Hence, the variable representative of one or more interfering communication links (i) can be dropped from the right side of EQ. 46. In dropping subscripts i and j from EQ. 46, variable r can be defined as follows:

$$r_{m,nl} = r_{m,nli}; \forall i \quad (47)$$

Thus, EQ. 46 can be defined as the following:

$$r_{m,nl} = \sum_k \sum_p \sum_j \rho_{m,nl,kpj}(\theta_{m,kpj} + \phi_{m,kpj} r_{m,kp}) \quad (48)$$

The summation operation on the right side of EQ. 48 can be split into two summation terms, where variable r can be moved outside the inner sum in the second summation term.

$$r_{m,nl} = \sum_k \sum_p \sum_j \rho_{m,nl,kpj} \theta_{m,kpj} + \sum_k \sum_p r_{m,kp} \sum_j \rho_{m,nl,kpj} \phi_{m,kpj} \quad (49)$$

Sub-beams l and p can be grouped with respective communication beams (n and k). In EQ. 49, an observation can be made that communication beam n and sub-beam l occur together and, similarly, communication beam k and sub-beam p occur together. Thus, subscripts l and n can be grouped together to obtain a single subscript. Subscripts p and k can likewise be grouped together to obtain a single subscript. In EQ. 50, variables l and p are retained to represent their respective groupings.

$$r_{m,l} = \sum_p \sum_j \rho_{m,l,pj} \theta_{m,pj} + \sum_p r_{m,p} \sum_j \rho_{m,l,pj} \phi_{m,pj} \quad (50)$$

Two additional variables are defined below to facilitate in the computation of EQ. 50.

$$\theta''_{m,l} = \sum_p \sum_j \rho_{m,l,pj} \theta_{m,pj} \quad (51)$$

$$\delta''_{m,lp} = \sum_j \rho_{m,l,pj} \phi_{m,pj} \quad (52)$$

Based on EQs. 51 and 52, EQ. 50 can be defined as follows:

$$r_{m,l} = \theta''_{m,l} + \sum_p \delta''_{m,lp} r_{m,p} \quad (53)$$

Similar to EQ. 20, EQ. 53 represents a set of linear equations that can be solved in a similar manner described above with respect to EQs. 21-24 in method 400. Variable $r_{m,l}$ represents a normalized beam power. After r is solved for sub-beam l, this value can be used in EQ. 45 to solve for power at the input of the transponder ($x_{m,nli}$).

(4)(B) An Embodiment of a Method to Compute Link Supportability Based on One or More Sub-Beams Based on the derivations of the variables above, method 700 will be described in further detail below. Method 700, as noted above, can be used to compute communication link supportability of a transponder in a WCDMA communications system in a U2B direction based on one or more sub-beams.

In referring to method 700 in FIG. 7, steps 705-720 are similar to steps 605-620, respectively, described above with respect to method 600.

In particular, step 705 computes a carrier to noise spectral density for a communication link of interest ($c_{m,nli}$) and a spectral overlap of a plurality of communication links ($\Delta_{m,nk}$). Step 710 accounts for a desired carrier to noise spectral density for the communication link of interest ($\phi_{m,l}$) and a noise factor in the transponder ($\theta_{m,l}$) based on the desired carrier to noise spectral density ($\theta_{m,l}$). Step 715 relates a transponder input power ($x_{m,nli}$) to uplink path gain values ($a_{m,kp,kpj}$ and $a_{m,kp,kpj}$). In an embodiment, the uplink path gain values account for one or more sub-beams associated with a communication beam of interest ($a_{m,nl,kpj}$) and one or more interfering communication beams ($a_{m,kp,kpj}$). Step 720 adjusts the spectral overlap of the plurality of communication links ($\Delta_{m,nk}$) for uplink path gains from a plurality of communication beams ($a_{m,kp,kpj}$ and $a_{m,kp,kpj}$).

Step 725 defines a first variable ($\theta''_{m,l}$) representative of a first multiplication of an adjusted spectral overlap factor ($\rho_{m,l,pj}$) and a noise factor ($\theta_{m,pj}$) in the transponder based on the desired carrier to noise spectral density ($\phi_{m,l}$). In an embodiment, EQ. 51 defines the first multiplication operation, where the first multiplication operation is summed over one or more interfering sub-beams (p) and one or more interfering communication links (j).

Step 730 defines a second variable ($\delta''_{m,lp}$) representative of a second multiplication of the adjusted spectral overlap factor ($\rho_{m,l,pj}$) and the desired carrier to noise spectral density ($\phi_{m,pj}$) for the communication link of interest. In an embodiment, EQ. 52 defines the second multiplication operation, where the second multiplication operation is summed over the one or more interfering communication links (j).

Step 735 defines a third variable ($r_{m,l}$) representative of a relationship between the first variable ($\theta''_{m,l}$) and the second variable ($\delta''_{m,lp}$). In an embodiment, EQ. 53 defines the third variable. As noted above, EQ. 53 represent a set of linear equations. Similar to $x_{m,n}$ in EQ. 20 above, variable $r_{m,l}$ can be expressed as a set of matrices, where each matrix ($\Gamma_m$) in the set of matrices contains a plurality of matrix elements ($\gamma$). In an embodiment, the plurality of matrix elements can be defined as equivalent to the second variable ($\delta''_{m,lp}$).

Steps 740-755 are similar to steps 540-555, respectively, described above with respect to method 500.

In particular, step 740 assesses whether each matrix ($\Gamma_m$) in the set of matrices (from step 735) represents an acceptable MAI. Step 745 computes a composite power for each communication beam in the WCDMA communications system based on step 705-740. Step 750 uses the composite power computation in step 745 to calculate the transponder input power ($x_{m,nli}$) for the communication link of interest (i). Step 755 performs steps 705-750 for one or more carrier signals in the WCDMA communications system.

Further, step 760 is similar to step 660, described above with respect to method 600. Specifically, step 760 assesses an optimal balance between accuracy in the computation of power at the input of the transponder ($x_{m,nli}$) and complexity in the computation.

(5) An Embodiment of a Method to Compute Link Supportability in a B2U Direction

Figure 8:
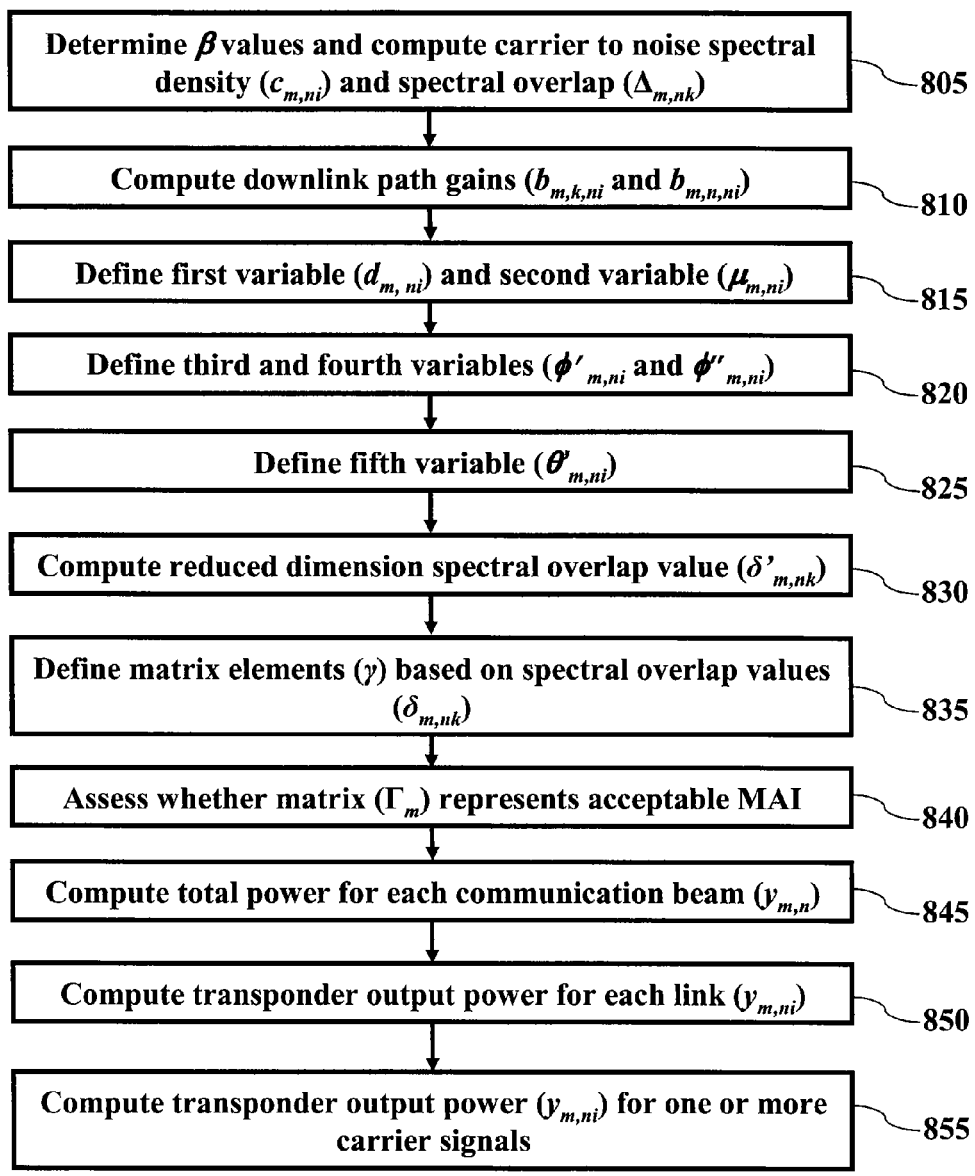
FIG. 8 is an illustration of an embodiment of a method for computing communication link supportability of a transponder in a WCDMA communications system in a base-to-user direction.

FIG. 8 is an illustration of an embodiment of a method 800 for computing communication link supportability of a transponder in a WCDMA communications system in a B2U direction. Similar to method 400, method 800 considers link specification parameters for substantially all communication links for substantially all communication beams of the satellite communications system (e.g., MUOS). Further, similar to method 400, method 800 assumes that a communication link between the satellite and the access module (e.g., communication link 140 in FIG. 1) does not have an appreciable effect on the overall link performance and supportability. However, based on the description herein, a person skilled in the relevant art will recognize that the concepts described below can be applied to the communication link between the satellite and the access module.

(5)(A) Derivation of Variables Used in an Embodiment to Compute Link Supportability To facilitate in the explanation of method 800, and in addition to the variables defined above with respect to method 400, the following variables will also be used:

y=power at an output of the transponder; and
b=downlink path gain (including antenna gains).

The remaining variables used in the explanation of method 800 are similar to those variables used above with respect to methods 400-700.

Similar to method 400, method 800 uses EQ. 1 as a starting point. Based on the power parameter $c_i$ defined in EQ. 1, method 800 accounts for the effects of communication beams and associated communication links outside the communication link of interest (i) in the B2U direction. Further, method 800 simplifies the computation for communication link supportability and system capacity for a satellite communications system (e.g., MUOS) in the B2U direction.

In the B2U direction, the communication signal waveforms are assumed to be compliant with the WCDMA communication protocol and to be nominally orthogonal waveforms. Although orthogonal waveforms can reduce adverse effects of MAI, not all communication links in the satellite communications system are perfectly orthogonal due to multi-beam considerations (e.g., interference generated by communication beams outside the communication beam of interest). Orthogonal waveforms compliant with the WCDMA communication protocol are well known to those skilled in the relevant art.

A factor $\beta$ is used to account for an imperfect orthogonality in a waveform transmitted from the transponder to a user terminal in the B2U direction. Imperfect orthogonality can result from a number of factors such as, for example, a transmitted signal from the transponder reflecting off a building or another surface before being received by a user terminal (e.g., user terminal 110 in FIG. 1). The factor $\beta$ is assumed to be a known value. In an embodiment, $\beta$ can have a value between 0 and 1 (i.e., $0 \leq \beta \leq 1$), where a value of '0' represents a perfect orthogonality in a waveform and a value of '1' represents a perfect non-orthogonality in the waveform.

Further, in an embodiment, method 800 does not take into account (e.g., negligible factors) an intermodulation noise factor and an uplink noise factor of the transponder in the computation of link supportability. As noted above, uplink noise represents, for example, a noise factor associated with a communication path from access module 150 to satellite 130 in FIG. 1.

A carrier signal to noise density ($c_{m,ni}$) for a communication link of interest (i) can be expressed in terms of a downlink path gain ($b_{m,n,ni}$), transponder output power ($y_{m,ni}$), a spectral overlap factor representative of one or more interfering communication links ($\Delta_{m,nk}$), and a non-orthogonality factor ($\beta_{m,ni}$). The carrier signal to noise density ($c_{m,ni}$) is defined in EQ. 54.

$$c_{m,ni} \leq \frac{b_{m,n,ni} y_{m,ni}}{\left[\beta_{m,ni} \sum_{kj \neq ni} \Delta_{m,nk} b_{m,k,ni} y_{m,kj}\right] + KT_{Em,ni}} \qquad (54)$$

Variable $b_{m,k,ni}$ represents a downlink path gain of the $k^{th}$ communication beam towards the user terminal used by the $i^{th}$ communication link in the $n^{th}$ communication beam, which uses the $m^{th}$ carrier signal. In EQ. 54, the subscripts for the downlink path gain in the numerator ($b_{m,n,ni}$) is different from the subscripts for the downlink path gain in the denominator ($b_{m,k,ni}$). Also, there is an asymmetry between the numerator and denominator subscripts in EQ. 54 for the B2U downlink, as compared to those subscripts used in the U2B uplink. This asymmetry is due to a different way that interference impacts performance in the two different directions. Further, the subscripts of the non-orthogonality factor ($\beta_{m,ni}$) indicate that this factor is dependent on the communication link of interest (i) and not an interfering communication link (j). As such, in an embodiment, the non-orthogonality factor ($\beta_{m,ni}$) can be moved to the outside of the summation operation in EQ. 54, which further simplifies the computation of output power of the transponder. The dependency of the non-orthogonality factor ($\beta_{m,ni}$) on the communication link of interest (i) is based on an assumption that MAI will depend on the location of the communication link of interest (i) regardless of the location of any interfering communication link.

EQ. 55 is a modification of EQ. 54, where the downlink path gain ($b_{m,n,ni}$) is divided through numerator and denominator portions of EQ. 54.

$$c_{m,ni} = \frac{y_{m,ni}}{\left[\beta_{m,ni} \sum_{kj \neq ni} \Delta_{m,nk}\left(\frac{b_{m,k,ni}}{b_{m,n,ni}}\right) y_{m,kj}\right] + \frac{KT_{Em,ni}}{b_{m,n,ni}}} \quad (55)$$

Further, in multiplying EQ. 55 through the denominator, the following equation can be derived:

$$y_{m,ni} = \left[c_{m,ni}\beta_{m,ni} \sum_{kj \neq ni} \Delta_{m,nk}\left(\frac{b_{m,k,ni}}{b_{m,n,ni}}\right) y_{m,kj}\right] + \frac{c_{m,ni}KT_{Em,ni}}{b_{m,n,ni}} \quad (56)$$

EQ. 57 can be derived from EQ. 56 by bringing variables $c_{m,ni}$ and $\beta_{m,ni}$ into the summation operation of EQ. 56.

$$y_{m,ni} = \left[\sum_{kj \neq ni} \Delta_{m,nk}\left(\frac{c_{m,ni}\beta_{m,ni}b_{m,k,ni}}{b_{m,n,ni}}\right) y_{m,kj}\right] + \frac{c_{m,ni}KT_{Em,ni}}{b_{m,n,ni}} \quad (57)$$

In comparison to the computation of link supportability in the U2B direction in method 400, the subscripts in the computation of link supportability in the B2U direction in method 800 contain asymmetry in EQs. 54-57 as compared to the subscripts in EQs. 7-10 with respect to method 400. This asymmetry in the subscripts in the B2U direction is due to an interference that occurs differently in the U2B direction than in the B2U direction.

In changing the term order of EQ. 57, EQ. 58 can be defined by the following:

$$y_{m,ni} = \frac{c_{m,ni}KT_{Em,ni}}{b_{m,n,ni}} + c_{m,ni}\beta_{m,ni} \sum_{kj \neq ni} \Delta_{m,nk}\left(\frac{b_{m,k,ni}}{b_{m,n,ni}}\right) y_{m,kj} \quad (58a)$$

Here, a new variable can be defined as follows:

$$\delta'_{m,nk} \equiv \Delta_{m,nk} \frac{\max}{i}\left(\frac{b_{m,k,ni}}{b_{m,n,ni}}\right) \quad (58b)$$

Hence, EQ. 58a can be approximated as the following:

$$y_{m,ni} \cong \frac{c_{m,ni}KT_{Em,ni}}{b_{m,n,ni}} + c_{m,ni}\beta_{m,ni} \sum_{kj \neq ni} \delta'_{m,nk} y_{m,kj} \quad (58c)$$

To further facilitate in the explanation of method 800, new variables $d_{m,ni}$ and $\mu_{m,k,ni}$ are defined below.

$$d_{m,ni} \equiv \frac{c_{m,ni}KT_{Em,ni}}{b_{m,n,ni}} \quad (59)$$

$$\mu_{m,ni} \equiv c_{m,ni}\beta_{m,ni} \quad (60)$$

Variable $d_{m,ni}$ represents a power that is required for the communication link of interest (i) to be operational in the B2U (or downlink) direction in the absence of MAI. Variable $\mu_{m,k,ni}$ represents a corrected carrier to noise spectral density that takes into account non-orthogonality ($\beta$). The variables defined in EQs. 59 and 60 can be plugged into EQ. 58 to produce EQ. 61. In EQ. 61, the summation operation is performed over all communication links with a subtraction of the term associated with the communication link of interest ($\Delta_{m,nn}\mu_{m,n,ni}y_{m,ni}$)

$$y_{m,ni} = d_{m,ni} + \mu_{m,ni} \sum_{k} \delta'_{m,nk} \sum_{j} y_{m,kj} - \delta'_{m,nn}\mu_{m,ni}y_{m,ni} \quad (61)$$

After simplifying the last term in EQ. 61 based on the variable definition in EQ. 60 and moving like terms to the left side of the equation, the following can be derived:

$$(1 + c_{m,ni}\beta_{m,ni}\Delta_{m,nn})y_{m,ni} = d_{m,ni} + c_{m,ni}\beta_{m,ni} \sum_{k} \delta'_{m,nk} \sum_{j} y_{m,kj} \quad (62)$$

The quantity in parenthesis on the left side of EQ. 62 can be divided through in EQ. 62 and additional variables can be defined to derive the following equation:

$$y_{m,ni} = \theta'_{m,ni} + \phi'_{m,ni} \sum_{k} \delta'_{m,nk} y_{m,k} \quad (63)$$

where $$\phi'_{m,ni} \equiv \frac{c_{m,ni}\beta_{m,ni}}{1 + c_{m,ni}\beta_{m,ni}\delta'_{m,nn}} \quad (64)$$

$$\theta'_{m,ni} \equiv \frac{d_{m,ni}}{1 + c_{m,ni}\beta_{m,ni}\delta'_{m,nn}} \quad (65)$$

Another new variable can be defined in EQ. 66, which will be used in the analysis below.

$$\phi''_{m,ni} \equiv \frac{\phi'_{m,ni}}{\beta_{m,ni}} = \frac{c_{m,ni}}{1 + c_{m,ni}\beta_{m,ni}\delta'_{m,nn}} \quad (66)$$

EQ. 67 is a representation of EQ. 61, where the summation operation is over each communication link (e.g., communication links i and j) for each communication beam (e.g., communication beams k and n).

$$y_{m,n} = \theta'_{m,n} + \phi'_{m,n} \sum_{k} \delta'_{m,nk} y_{m,k} \quad (67)$$

The subscript notation used in EQ. 67 is similar to that notation used above in EQs. 19 and 20 with respect to method 400.

EQ. 67 can be represented (in EQ. 68 below) as a set of vector equations for one or more carrier signals used in the transponder.

$$\vec{y}_m = \vec{\theta}_m + \Gamma'_m \vec{y}_m \quad (68)$$

From EQ. 68, m different Γ' matrices exist, where m is the number of carrier signals and the elements of each Γ' matrix can be defined by the following:

$$\gamma'_{m,nn} = \phi'_{m,nn} \delta'_{m,nn}; \text{ for orthogonal signals} \quad (69a)$$

$$\gamma'_{m,nk} = \phi''_{m,nk} \delta'_{m,nk}; \text{ for non-orthogonal signals} \quad (69b)$$

Based on EQs. 69a and 69b, off-diagonal entries with non-orthogonal signals apply EQ. 66, whereas diagonal entries with nominally orthogonal signals apply EQ. 64. Further, from EQ. 68, the following can be derived:

$$\vec{y}_m = (I - \Gamma'_m)^{-1} \vec{\theta}'_m \quad (70)$$

In EQ. 70, there are m matrices to be inverted, where each matrix has a dimensionality of $B_m \times B_m$, where $B_m$ represents the number communication beams using the $m^{th}$ carrier signal.

(5)(B) An Embodiment of a Method to Compute Link Supportability

Based on the derivations of the variables above, method 800 will be described in further detail below. Method 800, as noted above, can be used to compute communication link supportability of a transponder in a WCDMA communications system in a B2U direction.

In referring to method 800 in FIG. 8, step 805 defines a factor (β) to account for an imperfect orthogonality in a waveform from the transponder to a user terminal in the B2U direction. In addition, step 805 computes a carrier to noise spectral density for a communication link of interest ($c_{m,ni}$) and a spectral overlap of a plurality of communication links ($\Delta_{m,nk}$). In an embodiment, the carrier to noise spectral density ($c_{m,ni}$) and the spectral overlap of the plurality of communication links ($\Delta_{m,nk}$) are defined above with respect to EQs. 55 and 4, respectively.

Step 810 computes a downlink path gain for the communication link of interest ($b_{m,n,ni}$) and for one or more interfering communication links ($b_{m,n,ni}$).

Step 815 defines a first variable ($d_{m,ni}$) representative of a power for the communication link of interest (i) to be operational in the B2U direction. In an embodiment, the first variable ($d_{m,ni}$) can be defined by EQ. 59.

Step 815 also defines a second variable ($\mu_{m,k,ni}$) representative of a corrected carrier to noise spectral density that takes into account the non-orthogonality factor (β). In an embodiment, the second variable ($\mu_{m,k,ni}$) can be defined by EQ. 60.

Step 820 defines a third variable ($\phi'_{m,ni}$) representative of a relationship between the carrier to noise spectral density ($c_{m,ni}$) and the non-orthogonality factor (β). In an embodiment, the third variable ($\phi'_{m,ni}$) can be defined by EQ. 64. Step 820 also defines a fourth variable ($\phi''_{m,ni}$) representative of a non-orthogonal version of the third variable. In an embodiment, the fourth variable ($\phi''_{m,ni}$) can be defined by EQ. 66.

Step 825 defines a fifth variable ($\theta'_{m,ni}$) representative of a relationship between the first variable ($d_{m,ni}$), the carrier to noise spectral density ($c_{m,ni}$), and the non-orthogonality factor (β). In an embodiment, the fifth variable ($\theta'_{m,ni}$) can be defined by EQ. 65.

Step 830 computes a reduced dimension spectral overlap value ($\delta'_{m,nk}$) to reduce a dimensionality in the computation of communication link supportability. In an embodiment, the reduced dimension spectral overlap value ($\delta'_{m,nk}$) can be defined by EQ. 58b. As noted above, EQ. 58b can be applied to EQ. 58c in order to reduce a dimensionality in the computation of the transponder output power ($y_{m,ni}$). The calculation of the transponder output power ($y_{m,ni}$) in step 830 can be expressed as a set matrices, where each matrix ($\Gamma_m$) in the set of matrices contains a plurality of matrix elements (γ). In an embodiment, a set of vector equations representative of the set of matrices can be defined by EQ. 68.

In step 835 of method 800, each matrix element (γ) of each matrix ($\Gamma_m$) in the set of matrices (from step 830) is based on the reduced dimension spectral overlap values ($\delta'_{m,nk}$). In an embodiment, depending on the orthogonality of a given communication link in a beam pair, the value of the matrix element (γ) can vary. For instance, the matrix element (γ) can be defined by EQ. 69a for orthogonal signals, whereas the matrix element (γ) can be defined by EQ. 69b for non-orthogonal signals.

In step 840, each matrix ($\Gamma_m$) in the set of matrices is assessed whether multiple access interference (MAI) is acceptable. In an embodiment, EQ. 70 defines an inversion of each matrix ($\Gamma_m$) in the set of matrices. In solving EQ. 70, if any of the matrices are singular or if any of the matrix elements in any of the inverted matrices are negative then this is an indication that MAI is too great to support the communication links of interest. In an embodiment, if MAI is too great for link supportability, the number of active communication links or the communication link data rates may need to be reduced.

Step 845 computes a composite power for each communication beam in the WCDMA communications system based on steps 805-840. In an embodiment, the resulting values from EQ. 70 represent the composite uplink powers for the communication links measured at the input of the transponder and aggregated over each communication beam.

In step 850, the transponder input power ($y_{m,ni}$) for the communication link of interest (i) is computed using the composite power computation in step 845. In an embodiment, vector components from these resulting values in EQ. 70 (from step 845) are used to represent $y_{m,k}$ quantities, which can be substituted into the summation operation of EQ. 63. Accordingly, individual communication link powers for all communication links in all communication beams in the satellite communications system can be calculated.

Step 855 performs steps 805-850 for one or more carrier signals in the WCDMA communications system.

(6) Embodiment of a Method to Compute Link Supportability in a U2B Direction

Figure 9:
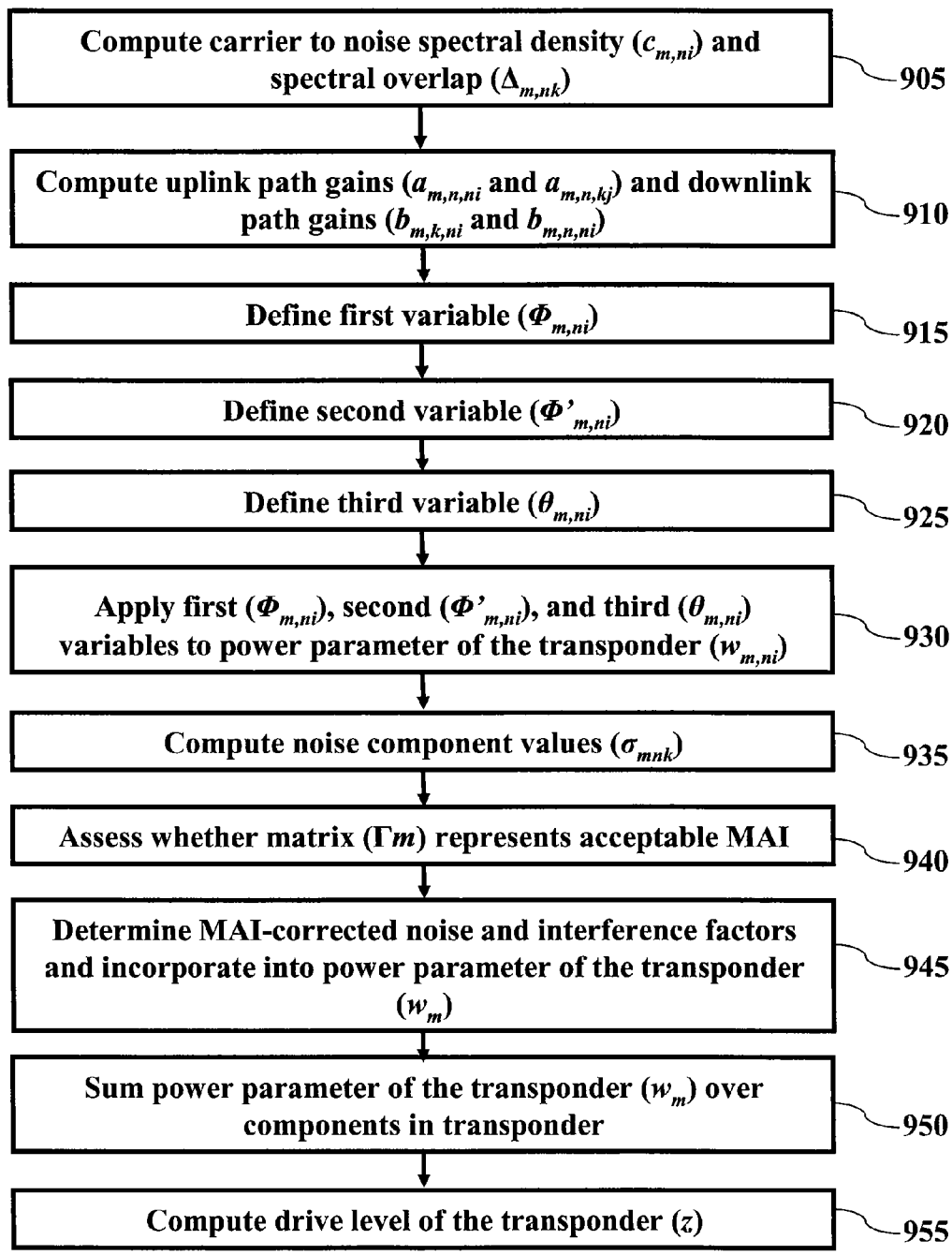
FIG. 9 is an illustration of an embodiment of a method for computing communication link supportability of a transponder in a WCDMA communications system that incorporates non-idealities of the transponder and a communication path between the transponder and an access module.

FIG. 9 is an illustration of an embodiment of a method 900 for computing link supportability of a transponder in a WCDMA communications system that incorporates non-linearities of the transponder and a communication path between the transponder and an access module. Non-linearities of the transponder can cause, for example, gain compression and intermodulation products, which are both known to those persons skilled in the relevant art. Method 900 considers both an uplink signal path and a downlink signal path to and from the transponder (e.g., from FIG. 1, uplink from user terminal 110 to satellite 130 and a corresponding downlink path from satellite 130 to access module 150). This method considers the case of multiple carriers going through a single non-linearity device in the transponder.

(6)(A) Derivation of Variables Used in an Embodiment to Compute Link Supportability As a starting point, method 900 assumes that a power parameter for a transponder ($w_{ni}$) can be defined by the following equation:

$$w_{ni} = c_{ni} \sum_{kj \neq ni} \Delta_{ni,kj} w_{kj} + c_{ni} k T_{Sn} G_n + c_{ni} g(z) h(z) \frac{P}{B} + d_{ni} P g(z) \quad (71)$$

The derivation of EQ. 71 can be found in "SATCOM Loading Analysis with Heterogeneous Gain States," by Jim Marshall and Jeffrey Heissler, *IEEE MILCOM* 2002, which is incorporated by reference in its entirety. However, EQ. 71 does not take into account MAI from other carrier signals using the same transponder.

To facilitate in the explanation of method 900, the following variables will be used:
- w=power parameter of the transponder;
- G=ideal gain of a sub-channel of the transponder;
- P=satellite power;
- B=satellite bandwidth;
- d=downlink power fraction;
- g(z)=gain compression in the transponder; and
- h(z)=intermodulation product.

Variable z represents a drive level of the non-linearity within the transponder. The remaining variables used in the explanation of method 900 are similar to those variables used above with respect to methods 400-800.

Based on the power parameter $w_{ni}$ defined in EQ. 71, method 900 takes into account all communication links, communication beams, and carrier signals that use the transponder. EQ. 72 is a modification of EQ. 42 that takes into account carrier m.

$$w_{mni} + c_{mni} \beta_{m,ni} \delta_{mnn} w_{mni} = c_{mni} \beta_{m,ni} \sum_k \delta_{mnk} \sum_j w_{m,kj} + \\ c_{mni} k T_{Sm} G_m + c_{mni} g(z) h(z) \frac{P}{B} + d_{mni} P g(z) \quad (72)$$

where $$\Delta_{ni,kj} \equiv \beta_{mni} \delta_{mnk} \quad (73)$$

$$\delta_{mnk} = \frac{\rho_{mnk}}{(1 - \eta_m) W} \quad (74)$$

$$w_{mni} = x_{mni} G_m \quad (75)$$

EQ. 72 can be modified to read as follows:

$$w_{mni}(1 + c_{mni} \beta_{mni} \delta_{mnn}) = \\ c_{mni} \beta_{m,ni} \sum_k \delta_{mnk} w_{m,k} + c_{mni} k T_{Sm} G_m + c_{mni} g(z) h(z) \frac{P}{B} + d_{mni} P g(z) \quad (76)$$

Three variables are defined to facilitate in the computation of EQ. 76.

$$\phi'_{mni} = \frac{c_{mni} \beta_{m,ni}}{(1 + c_{mni} \beta_{m,ni} \delta_{mnn})} \quad (76a)$$

$$\phi_{mni} = \frac{c_{mni}}{(1 + c_{mni} \beta_{m,ni} \delta_{mnn})} \quad (76b)$$

$$\theta_{mni} = \frac{d_{mni}}{(1 + c_{mni} \beta_{m,ni} \delta_{mnn})} \quad (76c)$$

In applying EQs. 76a-76c to EQ. 76, the following can be derived:

$$w_{mni} = \phi'_{mni} \sum_k \delta_{mnk} w_{m,k} + \phi_{mni} k T_{Sm} G_m + \phi_{mni} g(z) h(z) \frac{P}{B} + \theta_{mni} P g(z) \quad (77)$$

In summing EQ. 77 over one or more communication links of interest (i), the following can also be derived:

$$w_{mn} = \phi'_{mn} \sum_k \delta_{mnk} w_{m,k} + \phi_{mn} k T_{Sm} G_m + \phi_{mn} g(z) h(z) \frac{P}{B} + \theta_{mn} P g(z) \quad (78)$$

The expression defining the power parameter of the transponder ($w_{mn}$), in EQ. 78, can be converted to a set of vector equations for one or more carrier signals used in the transponder. In particular, EQ. 78 can be converted to a vector and matrix equation as follows:

$$\vec{w}_m = \Gamma_m \vec{w}_m + \vec{\sigma}_m + g(z) h(z) \frac{P}{B} \vec{\phi}_m + P g(z) \vec{\theta}_m \quad (79)$$

Here, in EQ. 79, vectors are indicated with an arrow above the variable. From EQ. 79, m different $\Gamma$ matrices exist, where m is the number of carrier signals and the elements of each $\Gamma_m$ matrix are defined by the following:

$$\gamma_{mnk} \equiv \phi'_{mn} \delta_{mnk} \quad (80)$$

A new variable ($\sigma_{mnk}$) is defined in EQ. 81 to help facilitate in the computation of EQ. 79.

$$\sigma_{mnk} \equiv \phi_{mn} k T_{Sm} G_m \quad (81)$$

In repeating EQ. 79 here, we have the following:

$$\vec{w}_m = \Gamma_m \vec{w}_m + \vec{\sigma}_m + g(z) h(z) \frac{P}{B} \vec{\phi}_m + P g(z) \vec{\theta}_m \quad (82)$$

In bringing like terms of EQ. 19 to the left side of the equation, the following equation can be derived:

$$(I - \Gamma_m) \vec{w}_m = \vec{\sigma}_m + g(z) h(z) \frac{P}{B} \vec{\phi}_m + P g(z) \vec{\theta}_m \quad (83)$$

By pre-multiplying by the inverse of the quantity in parentheses, in EQ. 83, the following can be derived:

$$\vec{w}_m = (I - \Gamma_m)^{-1} \vec{\sigma}_m + g(z) h(z) \frac{P}{B} (I - \Gamma_m)^{-1} \vec{\phi}_m + P g(z) (I - \Gamma_m)^{-1} \vec{\theta}_m \quad (84)$$

EQ. 84 can be simplified with the following new variables:

$$\vec{u}'_m = (I - \Gamma_m)^{-1} \vec{\sigma}_m \quad (85)$$

$$\vec{u}''_m = (I - \Gamma_m)^{-1} \vec{\phi}_m \quad (86)$$

$$\vec{v}_m = (I - \Gamma_m)^{-1} \vec{\theta}_m \quad (87)$$

EQ. 85 represents a MAI corrected version of transponder noise in an uplink direction. EQ. 86 represents a MAI corrected version of an intermodulation factor in the transponder. Further, EQ. 87 represents a MAI corrected version of transponder noise in the downlink direction. With the variables defined in EQs. 85-87, EQ. 84 can be expressed as follows:

$$\vec{w}_m = \vec{u}'_m + g(z)h(z)\frac{P}{B}\vec{u}''_m + Pg(z)\vec{v}_m \quad (88)$$

Now, the definition for z is as follows:

$$z = \left(\frac{1}{P}\right)\left(\sum_{all} w + k\sum_m T_{Sm}G_m B_m\right) \quad (89)$$

Variable z (a drive level of the non-linearity within the transponder) can be found by summing all components of variable w, including components for all communication links, for all communication beams and for all carrier signals. Accordingly, variable z can be expressed as the following:

$$z = \left(\frac{1}{P}\right)\left(\sum_{mn} u'_{mn} + g(z)h(z)\frac{P}{B}\sum_{mn} u''_{mn} + Pg(z)\sum_{mn} v_{mn} + k\sum_m T_{Sm}G_m B_m\right) \quad (90)$$

EQ. 90 can be solved for z to find the drive level for the high-power amplifier (HPA) in the transponder, considering all communication links, communication beams, and carriers in the HPA. Variable z relates to a level at which the transponder can be driven, where if the drive level is high, then more signal may be present at the output of the transponder. However, at the same time, with a higher drive level in z, intermodulation and gain compression increases accordingly. In solving for variable z, a tradeoff between signal strength and noise in the transponder can be assessed.

(6)(B) An Embodiment of a Method to Compute Link Supportability

Based on the derivations of the variables above, method 900 will be described in further detail below. Method 900, as noted above, can be used to compute communication link supportability of a transponder in a WCDMA communications system that incorporates non-linearities of the transponder and a communication path between the transponder and an access module.

In referring to method 900 in FIG. 9, step 905 computes a carrier to noise spectral density for a communication link of interest ($c_{m,ni}$) and a spectral overlap of a plurality of communication links ($\Delta_{m,nk}$). In an embodiment, the carrier to noise spectral density ($c_{m,ni}$) and the spectral overlap of the plurality of communication links ($\Delta_{m,nk}$) are defined above with respect to EQs. 2 and 4, respectively.

Step 910 computes an uplink path gain for the communication link of interest ($a_{m,n,ni}$) and for one or more interfering communication links ($a_{m,n,kj}$). Step 910 also computes a downlink path gain for the communication link of interest ($b_{m,n,ni}$) and for one or more interfering communication links ($b_{m,k,ni}$).

Step 915 defines a first variable ($\phi_{mni}$) In an embodiment, the first variable ($\phi_{mni}$) can be defined by EQ. 76b.

Step 920 defines a second variable ($\phi'_{mni}$) representative of a relationship between the carrier to noise spectral density ($c_{m,ni}$) and a non-orthogonality factor ($\beta$). In an embodiment, the second variable ($\phi'_{m,ni}$) can be defined by EQ. 76a.

Step 925 defines a third variable ($\theta_{mni}$). In an embodiment, the third variable ($\theta_{mni}$) can be defined by EQ. 76c.

Step 930 applies the first variable ($\phi_{mni}$), second variable ($\phi'_{mni}$), and third variable ($\theta_{mni}$) to an expression that defines a power parameter of the transponder ($w_{mni}$) In an embodiment, the expression defining the power parameter of the transponder ($w_{mni}$) can be defined by EQ. 78. The calculation of the power parameter of the transponder ($w_{mni}$) in step 930 can be expressed as a set matrices, where each matrix ($\Gamma_m$) in the set of matrices contains a plurality of matrix elements ($\gamma$). In an embodiment, a set of vector equations representative of the set of matrices can be defined by EQ. 79

In step 935 of method 900, noise component values ($\sigma_{mnk}$) are computed and incorporated into the expression defining the power parameter of the transponder ($w_{mni}$). In an embodiment, the noise component values ($\sigma_{mnk}$) can be defined by EQ. 81. Further, in an embodiment, EQ. 82 defines an incorporation of the noise component values ($\sigma_{mnk}$) in an expression defining power parameter of the transponder ($w_{mni}$)

Step 940 each matrix ($\Gamma_m$) in the set of matrices is assessed whether the multiple access interference (MAI) is acceptable. In an embodiment, EQ. 83 defines an inversion of each matrix ($\Gamma_m$) in the set of matrices. In solving EQ. 83, if any of the matrices are singular or if any of the matrix elements in any of the inverted matrices are negative then this is an indication that MAI is too great to support the communication links of interest. In an embodiment, if MAI is too great for link supportability, the number of active communication links or the communication link data rates may need to be reduced.

Step 945 defines MAI-corrected noise and interference factors ($\vec{u}'_m$, $\vec{u}''_m$, and $\vec{v}_m$) and incorporates these factors into the expression defining the power parameter of the transponder ($w_m$). In an embodiment, correction factors $\vec{u}'_m$, $\vec{u}''_m$, and $\vec{v}_m$ can be defined by EQs. 85, 86, and 87, respectively. Further, in an embodiment, the expression defining the power parameter of the transponder ($w_m$) that incorporates the correction factors ($\vec{u}'_m$, $\vec{u}''_m$, and $\vec{v}_m$) can be defined by EQ. 88.

Step 950 sums the power parameter of the transponder ($w_m$) over all communication links, communication beams, and carrier signals using the transponder. In an embodiment, the summation of the power parameter of the transponder ($w_m$) over all communication links, communication beams, and carrier signals can be represented by the $$\left(\sum_{all} w\right)$$

term in EQ. 89.

Step 955 computes the drive level of the transponder (z) based on the summation of the power parameter of the transponder ($w_m$) in step 945. In an embodiment, EQ. 90 can be used to solve for z.

Figure 10:
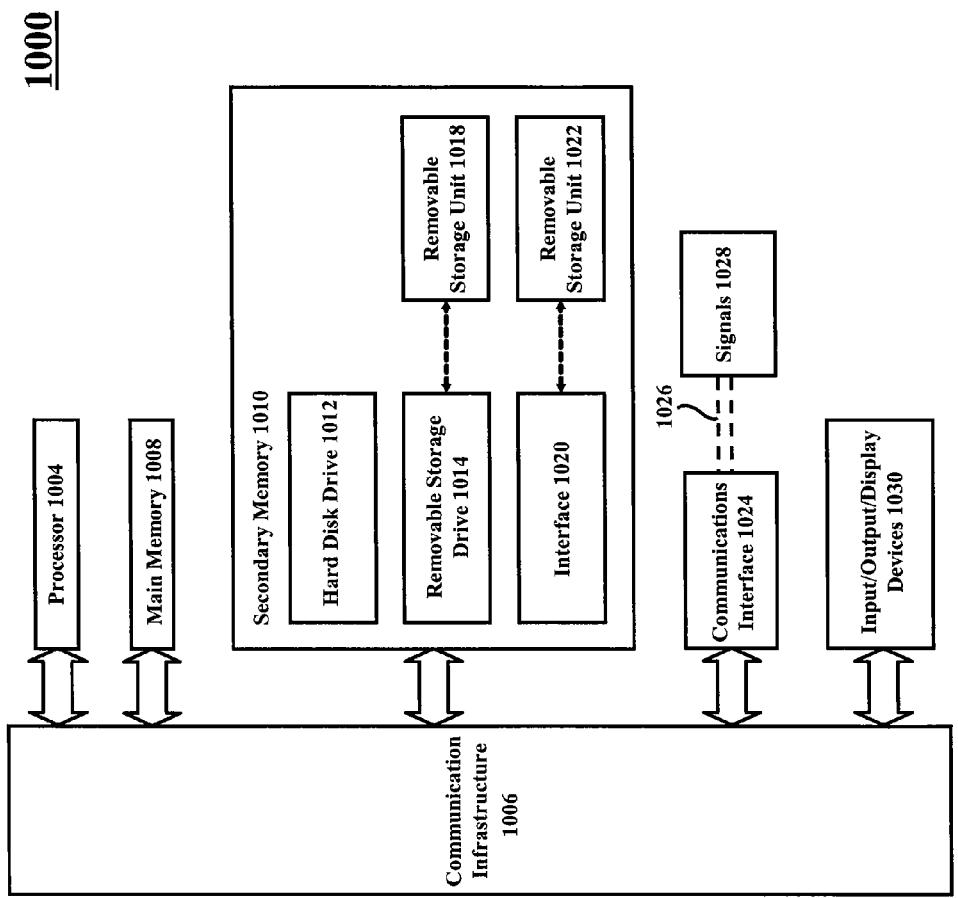
FIG. 10 is an illustration of an embodiment of a computer system in which embodiments of the present invention can be implemented.

Computer System in which Embodiments of the Present Invention can be Implemented Embodiments of the present invention (such as the operational embodiments described herein) can be implemented using hardware, software or a combination thereof and may be implemented in a computer system or other processing system. In an embodiment, the invention is directed toward a computer program product executing on a computer system 1000 capable of carrying out the functionality described herein. An example of computer system 1000 is shown in FIG. 10. Computer system 1000 includes one or more processors, such as processor 1004. Processor 1004 is connected to a communication bus 1006. Various software embodiments are described in terms of this example computer system. After reading the description below, it will become apparent to a person skilled in the relevant art how to implement embodiments of the present invention using other computer systems and/or computer architectures.

Computer system 1000 also includes a main memory 1008, preferably random access memory (RAM), and may also include a secondary memory 1010. Secondary memory 1010 can include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018, represents a floppy disk, magnetic tape, optical disk, memory card, etc. which is read by and written to by removable storage drive 1014. As will be appreciated by those skilled in the relevant art, removable storage unit 1018 includes a computer usable storage medium having stored therein computer software and/or data.

In alternative embodiments, secondary memory 1010 can include other similar means for allowing computer programs or other instructions to be loaded into computer system 1000. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 can also include a communication interface 1024. Communication interface 1024 enables computer 1000 to communicate with external and/or remote devices. For example, communication interface 1024 allows software and data to be transferred between computer system 1000 and external devices. Communication interface 1024 also allows computer 1000 to communicate over communication networks, such as LANs, WANs, the Internet, etc. Communication interface 1024 can interface with remote sites or networks via wired or wireless connections. Examples of communications interface 1024 can include a modem, a network interface (such as an Ethernet card), a communications port, a PCMCIA slot and card, etc. Computer 1000 receives data and/or computer program products via communication network 1024. Software and data transferred via communications interface 1024 are in the form of signals 1028 which can be electronic, electromagnetic, optical, or other signals capable of being received by communications interface 1024. These signals 1028 are provided to communications interface 1024 via a communications path (i.e., channel) 1026. Channel 1026 carries signals 1028 and can be implemented using wire or cable, fiber optics, a phone line, a cellular phone link, an RF link and other wired or wireless communications channels.

In this document, the terms "computer program medium" and "computer usable medium" are used to generally refer to media such as removable storage drive 1014, a hard disk installed in hard disk drive 1012, and signals 1028. These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to perform features of embodiments of the present invention as discussed herein. In particular, the computer programs, when executed, enable the processor 1004 to perform features of embodiments of the present invention. Accordingly, such computer programs represent controllers of the computer system 1000.

When an embodiment of the present invention is implemented using software, the software can be stored in a computer program product and loaded into computer system 1000 using removable storage drive 1014, hard disk drive 1012, or communications interface 1024. The control logic (software), when executed by the processor 1004, causes the processor 1004 to perform functions of embodiments of the present invention as described herein.

Computer system 1000 also includes input/output/display devices 1032, such as monitors, keyboards, pointing devices, etc.

Embodiments of the present invention can work with software, hardware, and operating system implementations other than those described herein. Any software, hardware, and operating system implementations suitable for performing the functions described herein can be used.

CONCLUSION

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer program product comprising a non-transitory computer-readable medium having computer program code executable by a processor, where the computer program code includes:

first computer readable program code that enables a processor to account for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);

second computer readable program code that enables a processor to adjust a spectral overlap of a plurality of communication links ($\Delta_{m,nk}$) for uplink path gains from a plurality of communication beams ($a_{m,n,ni}$ and $a_{m,n,kj}$);

third computer readable program code that enables a processor to apply reduced dimension spectral overlap values ($\delta_{m,nk}$), based on the adjusted spectral overlap values ($\rho_{m,k,kj}$) of the plurality of communication beams, to an expression that defines a transponder input ($x_{m,ni}$) for a communication beam of interest (n);

fourth computer readable program code that enables a processor to compute the transponder input power ($x_{m,ni}$) for the communication link of interest (i) using a composite power computation ($x_{m,n}$); and wherein i and j represent communication link indices, k and n represent communication beam indices, n indicates a communication beam of interest, and m indicates a plurality of communication beams that do not include the communication beam of interest.

2. The computer program product of claim 1, further comprising:

fifth computer readable program code that enables a processor to perform the instructions executed by the first, second, third, and fourth computer readable program code for one or more carrier signals in the WCDMA communications system.

3. The computer program product of claim 1, wherein the first computer readable program code comprises:

fifth computer readable program code that enables a processor to compute a carrier to noise spectral density for the communication link of interest ($c_{m,ni}$) and a spectral overlap of a plurality of communication links ($\Delta_{m,nk}$).

4. The computer program product of claim 3, wherein the fifth computer readable program code comprises:

sixth computer readable program code that enables a processor to compute carrier to noise spectral density for the communication link of interest ($c_{m,ni}$) comprises defining the carrier to noise spectral density for the communication link of interest ($c_{m,ni}$) as $$c_{m,ni} \leq \frac{x_{m,ni}}{KT_{Sm,n} + \sum_{kj \neq ni} \Delta_{m,nk} x_{m,n,kj}}$$

where K is Boltzmann's constant and $T_{Sm,n}$ is a noise temperature at an input of a satellite.

5. The computer program product of claim 3, wherein the fifth computer readable program code comprises:

sixth computer readable program code that enables a processor to compute the spectral overlap of the plurality of communication links ($\Delta_{m,nk}$) comprises defining the spectral overlap of the plurality of communication links ($\Delta_{m,nk}$) as $$\Delta_{m,nk} \cong \frac{(1-\alpha/4)}{[1-\min(\eta_{m,n},\eta_{m,k})]R_c}$$

where α represents a roll-off factor of a square-root raised cosine pulse-shaping function, $R_c$ represents a chip rate used in the WCDMA communication protocol, and η represents a fraction of a notched band used to support an adaptive use of bandwidth in a WCDMA communication protocol.

6. The computer program product of claim 1, wherein the first computer readable program code comprises:

fifth computer readable program code that enables a processor to define a factor that accounts for the desired carrier to noise spectral density for the communication link of interest ($\phi_{m,ni}$) as $$\phi_{m,ni} \equiv \frac{c_{m,ni}}{1+c_{m,ni}\Delta_{m,ni}}.$$

7. The computer program product of claim 1, wherein the first computer readable program code comprises:

fifth computer readable program code that enables a processor to define the noise factor in the transponder ($\theta_{m,ni}$) as $$\theta_{m,ni} = \phi_{m,ni} KT_{Sm,n}.$$

8. The computer program product of claim 1, wherein the second computer readable program code comprises:

fifth computer readable program code that enables a processor to define a factor that accounts for the adjustment in the spectral overlap ($\rho_{m,k,kj}$) as $$\rho_{m,n,kj} \equiv \Delta_{m,nk} \frac{a_{m,n,kj}}{a_{m,k,kj}}.$$

9. The computer program product of claim 1, wherein the second computer readable program code comprises:

fifth computer readable program code that enables a processor to compute the uplink path gain for the communication link of interest ($a_{m,n,ni}$) and for one or more interfering communication links ($a_{m,n,kj}$).

10. The computer program product of claim 1, wherein the third computer readable program code comprises:

fifth computer readable program code that enables a processor to define the reduced dimension spectral overlap values ($\delta_{m,nk}$) as $$\delta_{m,nk} \equiv \frac{1}{\sum_j \phi_{m,kj}} \left( \sum_j \phi_{m,kj} \rho_{m,n,kj} \right).$$

11. The computer program product of claim 1, wherein the third computer readable program code comprises:

fifth computer readable program code that enables a processor to define the reduced dimension spectral overlap values ($\delta_{m,nk}$) as a worst-case variation in a value of the adjusted spectral overlap ($\rho_{m,k,kj}$) by the following expression $$\delta_{m,nk} \equiv \max_j (\rho_{m,n,kj}).$$

12. The computer program product of claim 1, wherein the third computer readable program code comprises:

fifth computer readable program code that enables a processor to calculate the transponder input power ($x_{m,ni}$) using a set of matrices, each matrix ($\Gamma_m$) in the set of matrices containing a plurality of matrix elements (γ).

13. The computer program product of claim 12, wherein the fifth computer readable program code comprises:

sixth computer readable program code that enables a processor to define each matrix element (γ) of each matrix ($\Gamma_m$) based on the reduced dimension spectral overlap values ($\delta_{m,nk}$).

14. The computer program product of claim 13, wherein the third computer readable program code comprises:

sixth computer readable program code that enables a processor to define each element (γ) of each matrix ($\Gamma_m$) as $$\gamma_{m,nk} = \phi_{m,n}\delta_{m,nk}.$$

15. The computer program product of claim 12, wherein the fifth computer readable program code comprises:
    sixth computer readable program code that enables a processor to assess whether each matrix ($\Gamma_m$) in the set of matrices has acceptable multiple access interference.

16. The computer program product of claim 15, wherein the sixth computer readable program code comprises:
    seventh computer readable program code that enables a processor to determine at least one of whether a matrix ($\Gamma_m$) in the set of matrices is singular and whether an element in an inverted matrix corresponding to a matrix ($\Gamma_m$) in the set of matrices is negative.

17. The computer program product of claim 1, wherein the third computer readable program code comprises:
    fifth computer readable program code that enables a processor to define the transponder input power ($x_{m,ni}$) as $$x_{m,ni} = \theta_{m,ni} + \phi_{m,ni}\sum_k \sum_j \rho_{m,n,kj} x_{m,kj}.$$

18. The computer program product of claim 1, wherein the fourth computer readable program code comprises:
    fifth computer readable program code that enables a processor to compute a composite power for each communication beam ($x_{m,n}$) in the WCDMA communications system based on results from instructions executed by the first, second, and third computer readable program code.

19. The computer program product of claim 18, wherein the fifth computer readable program code comprises:
    sixth computer readable program code that enables a processor to compute the composite power for each communication beam ($x_{m,n}$) comprises aggregating uplink power from one or more communication links over each communication beam in the WCDMA communications system.

20. A method for computing communication link supportability of a transponder in a WCDMA communications system in a user-to-base direction based on a bounded or approximate performance, the method comprising:
    (a) accounting for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);
    (b) adjusting a spectral overlap of a plurality of communication links ($\Delta_{m,nk}$) for uplink path gains from a plurality of communication beams ($a_{m,n,ni}$ and $a_{m,n,kj}$);
    (c) applying reduced dimension spectral overlap values ($\delta_{m,nk}$), based on the adjusted spectral overlap values ($\rho_{m,k,kj}$) of the plurality of communication beams, to an expression that defines a transponder input power ($x_{m,ni}$) for a communication beam of interest (n);
    (d) computing the transponder input power ($x_{m,ni}$) for the communication link of interest (i) using a composite power computation ($x_{m,n}$); and
    wherein i and j represent communication link indices,
    k and n represent communication beam indices,
    n indicates a communication beam of interest, and
    m indicates a plurality of communication beams that do not include the communication beam of interest.

21. A system configured to compute communication link supportability of a transponder in a Wideband Code Multiple Access (WCDMA) communications system in a user-to-base direction based on a bounded or approximate performance, the system comprising:
    one or more processors configured to execute modules comprising:
    an accounting module configured to account for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);
    an adjustment module configured to adjust a spectral overlap of a plurality of communication links ($\Delta_{m,nk}$) for uplink path gains from a plurality of communication beams ($a_{m,n,ni}$ and $a_{m,n,kj}$);
    an application module configured to apply reduced dimension spectral overlap values ($\delta_{m,nk}$), based on the adjusted spectral overlap values ($\rho_{m,k,kj}$) of the plurality of communication beams, to an expression that defines a transponder input power ($x_{m,ni}$) for a communication beam of interest (n);
    a computation module configured to compute the transponder input power ($x_{m,ni}$)
    for the communication link of interest (i) using a composite power computation ($x_{m,n}$); and
    wherein i and j represent communication link indices,
    k and n represent communication beam indices,
    n indicates a communication beam of interest, and
    m indicates a plurality of communication beams that do not include the communication beam of interest.

22. A computer program product comprising a non-transitory computer-readable medium having computer program code executable by a processor, wherein the computer program code includes:
    first computer readable program code that enables a processor to account for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);
    second computer readable program code that enables a processor to adjust a spectral overlap of a plurality of communication links ($\Delta_{m,nk}$) for uplink path gains from a plurality of communication beams ($a_{m,n,ni}$ and $a_{m,n,kj}$);
    third computer readable program code that enables a processor to define a first variable ($\theta''_{m,n}$) representative of a first multiplication of the adjusted spectral overlap factor ($\mu_{m,n,kj}$) and the noise factor in the transponder ($\theta_{m,ni}$);
    fourth computer readable program code that enables a processor to define a second variable ($\delta''_{m,nk}$) representative of a second multiplication of the adjusted spectral overlap factor ($\rho_{m,n,kj}$) and the desired carrier to noise spectral density ($\phi_{m,ni}$) for the communication link of interest (i);
    fifth computer readable program code that enables a processor to define a normalized beam power ($r_{m,n}$) based on the first variable ($\theta''_{m,n}$) and the second variable ($\delta''_{m,nk}$);
    sixth computer readable program code that enables a processor to compute the transponder input power ($x_{m,ni}$) for the communication link of interest (i) using a composite power computation ($x_{m,n}$); and
    wherein i and j represent communication link indices,
    k and n represent communication beam indices,
    n indicates a communication beam of interest, and m indicates a plurality of communication beams that do not include the communication beam of interest.

23. The computer program product of claim 22, further comprising:
seventh computer readable program code that enables a processor to perform the instructions executed by the first, second, third, fourth, fifth, and sixth computer readable program code for one or more carrier signals in the WCDMA communications system.

24. The computer program product of claim 22, wherein the first computer readable program code comprises:
seventh computer readable program code that enables a processor to compute a carrier to noise spectral density for the communication link of interest ($c_{m,ni}$) and a spectral overlap of a plurality of communication links ($\Delta_{m,nk}$).

25. The computer program product of claim 22, wherein the second computer readable program code comprises:
seventh computer readable program code that enables a processor to compute an uplink path gain for the communication link of interest ($a_{m,n,ni}$) and for one or more interfering communication links ($a_{m,n,kj}$).

26. The computer program product of claim 22, wherein the third computer readable program code comprises:
seventh computer readable program code that enables a processor to define the first variable ($\theta''_{m,n}$) as $$\theta''_{m,n} = \sum_k \sum_j \rho_{m,n,kj} \theta_{m,kj}.$$

27. The computer program product of claim 22, wherein the fourth computer readable program code comprises:
seventh computer readable program code that enables a processor to define the second variable ($\delta''_{m,nk}$) as $$\delta''_{m,nk} = \sum_j \rho_{m,n,kj} \phi_{m,kj}.$$

28. The computer program product of claim 22, wherein the fifth computer readable program code comprises:
seventh computer readable program code that enables a processor to define the normalized beam power ($r_{m,n}$) as $$r_{m,n} = \theta''_{m,n} + \sum_k \delta''_{m,nk} r_{m,k}.$$

29. The computer program product of claim 22, wherein the fifth computer readable program code comprises:
seventh computer readable program code that enables a processor to calculate the normalized beam power ($r_{m,n}$) using a set of matrices, each matrix ($\Gamma_m$) in the set of matrices containing a plurality of matrix elements ($\gamma$).

30. The computer program product claim of claim 29, wherein the seventh computer readable program code comprises:
eighth computer readable program code that enables a processor to assess whether each matrix ($\Gamma_m$) in the set of matrices has acceptable multiple access interference.

31. The computer program product of claim 22, wherein the sixth computer readable program code comprises:
seventh computer readable program code that enables a processor to compute the normalized beam power ($r_{m,n}$) for each communication beam in the WCDMA communications system based on results from instructions executed by the first, second, third, fourth, and fifth computer readable program code.

32. A method for computing communication link supportability of a transponder in a WCDMA communications system in a user-to-base direction based on a low-dimension approach, the method comprising:
(a) accounting for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);
(b) adjusting a spectral overlap of a plurality of communication links ($\Delta_{m,nk}$) for uplink path gains from a plurality of communication beams ($a_{m,n,ni}$ and $a_{m,n,kj}$);
(c) defining a first variable ($\theta''_{m,n}$) representative of a first multiplication of the adjusted spectral overlap factor ($\rho_{m,n,kj}$) and the noise factor in the transponder ($\theta_{m,ni}$);
(d) defining a second variable ($\delta''_{m,nk}$) representative of a second multiplication of the adjusted spectral overlap factor ($\rho_{m,n,kj}$) and the desired carrier to noise spectral density ($\phi_{m,ni}$) for the communication link of interest (i);
(e) defining a normalized beam power ($r_{m,n}$) based on the first variable ($\theta''_{m,n}$) and the second variable ($\delta''_{m,nk}$);
computing a transponder input power ($x_{m,ni}$) for the communication link of interest (i) using a composite power computation ($x_{m,n}$); and
wherein i and j represent communication link indices,
k and n represent communication beam indices,
n indicates a communication beam of interest, and
m indicates a plurality of communication beams that do not include the communication beam of interest.

33. A system configured to compute communication link supportability of a transponder in a Wideband Code Multiple Access (WCDMA) communications system in a user-to-base direction based on a low-dimension approach, the system comprising:
one or more processors configured to execute modules comprising:
an accounting module configured to account for a desired carrier to noise spectral density for a communication link of interest ($\phi_{m,ni}$) and a noise factor in the transponder ($\theta_{m,ni}$) based on the desired carrier to noise spectral density ($\phi_{m,ni}$);
an adjustment module configured to adjust a spectral overlap of a plurality of communication links ($\Delta_{m,nk}$) for uplink path gains from a plurality of communication beams ($a_{m,n,ni}$ and $a_{m,n,kj}$);
a first definition module configured to define a first variable ($\theta''_{m,n}$) representative of a first multiplication of the adjusted spectral overlap factor ($\rho_{m,n,kj}$) and the noise factor in the transponder ($\theta_{m,ni}$);
a second definition module configured to define a second variable ($\delta''_{m,nk}$) representative of a second multiplication of the adjusted spectral overlap factor ($\rho_{m,n,kj}$) and the desired carrier to noise spectral density ($\phi_{m,ni}$) for the communication link of interest (i);
a third definition module configured to define a normalized beam power ($r_{m,n}$) based on the first variable ($\theta''_{m,n}$) and the second variable ($\delta''_{m,nk}$);
a computation module configured to compute a transponder input power ($x_{m,ni}$) for the communication link of interest (i) using a composite power computation ($x_{m,n}$); and
wherein i and j represent communication link indices,
k and n represent communication beam indices,
n indicates a communication beam of interest, and m indicates a plurality of communication beams that do not include the communication beam of interest.

34. A computer program product comprising a non-transitory computer-readable medium having computer program code executable by a processor, where the computer code includes:

first computer readable program code that enables a processor to account for a desired carrier to noise spectral density for a communication link of interest ($\phi_{m,i}$) and a noise factor in the transponder ($\theta_{m,i}$) based on the desired carrier to noise spectral density ($\phi_{m,i}$);

second computer readable program code that enables a processor to relate a transponder input power ($x_{m,nli}$) to uplink path gain values for one or more sub-beams associated with a communication beam of interest ($a_{m,nl,kpj}$) and one or more interfering communication beams ($a_{m,kp,kpj}$);

third computer readable program code that enables a processor to adjust a spectral overlap of the plurality of communication links ($\Delta_{m,nk}$) for uplink path gains from a plurality of communication beams ($a_{m,nl,kpj}$ and $a_{m,kp,kpj}$);

fourth computer readable program code that enables a processor to apply reduced dimension spectral overlap values ($\delta_{m,lp}$) to an expression that defines the transponder input power ($x_{m,nli}$) for a communication beam of interest (n);

fifth computer readable program code that enables a processor to compute the transponder input power ($x_{m,nli}$) for the communication link of interest (i) using a composite power computation; and wherein i and j represent communication link indices, k and n represent communication beam indices, n indicates a communication beam of interest, and m indicates a plurality of communication beams that do not include the communication beam of interest.

35. The computer program product of claim 34, further comprising:

sixth computer readable program code that enables a processor to perform the instructions executed by the first, second, third, fourth, and fifth computer readable program code for one or more carrier signals in the WCDMA communications system; and seventh computer readable program code that enables a processor to assess an optimal balance between accuracy in the computation of power at the input of the transponder ($x_{m,nli}$) and complexity of the computation.

36. The computer program product of claim 34, wherein the first computer readable program code comprises:

sixth computer readable program code that enables a processor to compute the carrier to noise spectral density for the communication link of interest ($c_{m,nli}$) and a spectral overlap of a plurality of communication links ($\Delta_{m,nk}$).

37. The computer program product of claim 34, wherein the second computer readable program code comprises:

sixth computer readable program code that enables a processor to define the transponder input power ($x_{m,nli}$) as $$x_{m,nli} = c_{m,nli} KT_{Sm,n} + c_{m,nli} \sum_{kpj \neq nli} \Delta_{m,nk} \left( \frac{a_{m,nl,kpj}}{a_{m,kp,kpj}} \right) x_{m,kpj}.$$

38. The computer program product of claim 34, wherein the third computer readable program code comprises:

sixth computer readable program code that enables a processor to define a factor that accounts for the adjustment in the spectral overlap ($\rho_{m,nl,kj}$) as $$\rho_{m,nl,kpj} \equiv \Delta_{m,nk} \frac{a_{m,nl,kpj}}{a_{m,kp,kpj}}.$$

39. The computer program product of claim 34, wherein the fourth computer readable program code comprises:

sixth computer readable program code that enables a processor to define reduced dimension spectral overlap values ($\delta_{m,lp}$) based on the adjusted spectral overlap ($\rho_{m,nl,kpj}$) of the plurality of communication beams.

40. The computer program product of claim 39, wherein the sixth computer readable program code comprises:

seventh computer readable program code that enables a processor to define the reduced dimension spectral overlap values ($\delta_{m,lp}$) comprises defining the reduced dimension spectral overlap values ($\delta_{ml,p}$) as $$\delta_{m,lp} \equiv \frac{1}{\sum_j \phi_{m,kpj}} \left( \sum_j \phi_{m,kpj} \rho_{m,nl,kpj} \right).$$

41. The computer program product of claim 39, wherein the sixth computer readable program code comprises:

seventh computer readable program code that enables a processor to define the reduced dimension spectral overlap values ($\delta_{m,lp}$) comprises defining the reduced dimension spectral overlap values ($\delta_{m,lp}$) as a worst-case variation in a value of the adjusted spectral overlap ($\rho^{m,nl,kpj}$) by the following expression $$\delta_{m,lp} \equiv \max_j (\rho_{m,nl,kpj}).$$

42. The computer program product of claim 34, wherein the fourth computer readable program code comprises:

sixth computer readable program code that enables a processor to calculate the transponder input power ($x_{m,nli}$) using a set of matrices, each matrix ($\Gamma_m$) in the set of matrices containing a plurality of matrix elements ($\gamma$).

43. The computer program product of claim 42, wherein the sixth computer readable program code comprises:

seventh computer readable program code that enables a processor to define each matrix element ($\gamma$) of each matrix ($\delta_m$) based on the reduced dimension spectral overlap values ($\delta_{m,lp}$).

44. The computer program product of claim 42, wherein the sixth computer readable program code comprises:

seventh computer readable program code that enables a processor to assess whether each matrix ($\Gamma_m$) in the set of matrices has acceptable multiple access interference.

45. The computer program product of claim 34, wherein the sixth computer readable program code comprises:

seventh computer readable program code that enables a processor to define the transponder input power ($x_{m,nli}$) as $$x_{m,nli} = \theta_{m,nli} + \phi_{m,nli} \sum_k \sum_p \sum_j \rho_{m,nl,kpj} x_{m,kpj}.$$

46. The computer program product of claim 34, wherein the fifth computer readable program code comprises:
   sixth computer readable program code that enables a processor to compute a composite power for each communication beam in the WCDMA communications system based on results from instructions executed by the first, second, third, and fourth computer readable program code.

47. A method for computing communication link supportability of a transponder in a WCDMA communications system in a user-to-base direction based on reduced dimension spectral overlap values and one or more sub-beams, the method comprising:
   (a) accounting for a desired carrier to noise spectral density for a communication link of interest ($\phi_{m,l}$) and a noise factor in the transponder ($\theta_{m,l}$) based on the desired carrier to noise spectral density ($\phi_{m,l}$);
   (b) relating a transponder input power ($x_{m,nli}$) to uplink path gain values for one or more sub-beams associated with a communication beam of interest ($a_{m,nl,kpj}$) and one or more interfering communication beams ($a_{m,kp,kpj}$);
   (c) adjusting a spectral overlap of the plurality of communication links ($\Delta_{m,nk}$) for uplink path gains from a plurality of communication beams ($a_{m,nl,kpj}$ and $a_{m,kp,kpj}$);
   (d) applying reduced dimension spectral overlap values ($\delta_{m,lp}$) to an expression that defines the transponder input power ($x_{m,nli}$) for a communication beam of interest (n);
   (e) computing the transponder input power ($x_{m,nli}$) for the communication link of interest (i) using a composite power computation; and
   wherein i and j represent communication link indices,
   k and n represent communication beam indices,
   n indicates a communication beam of interest, and
   m indicates a plurality of communication beams that do not include the communication beam of interest.

48. A system configured to compute communication link supportability of a transponder in a Wideband Code Multiple Access (WCDMA) communications system in a user-to-base direction based on reduced dimension spectral overlap values and one or more sub-beams, the system comprising:
   one or more processors configured to execute modules comprising:
   an accounting module configured to account for a desired carrier to noise spectral density for a communication link of interest ($\phi_{m,l}$) and a noise factor in the transponder ($\theta_{m,l}$) based on the desired carrier to noise spectral density ($\phi_{m,l}$);
   a relation module configured to relate a transponder input power ($x_{m,nli}$) to uplink
   path gain values for one or more sub-beams associated with a communication beam of interest ($a_{m,nl,kpj}$) and one or more interfering communication beams ($a_{m,kp,kpj}$);
   an adjustment module configured to adjust a spectral overlap of the plurality of communication links ($\Delta_{m,nk}$) for uplink path gains from a plurality of communication beams ($a_{m,nl,kpj}$ and $a_{m,kp,kpj}$);
   an application module configured to apply reduced dimension spectral overlap values ($\delta_{m,lp}$) to an expression that defines the transponder input power ($x_{m,nli}$) for a communication beam of interest (n);
   a computation module configured to compute the transponder input power ($x_{m,nli}$) for the communication link of interest (i) using a composite power computation; and
   wherein i and j represent communication link indices,
   k and n represent communication beam indices,
   n indicates a communication beam of interest, and
   m indicates a plurality of communication beams that do not include the communication beam of interest.

49. A computer program product comprising a non-transitory computer-readable medium having computer program code executable by a processor, where the computer program code includes:
   first computer readable program code that enables a processor to account for a desired carrier to noise spectral density for a communication link of interest ($\phi_{m,l}$) and a noise factor in the transponder ($\theta_{m,l}$) based on the desired carrier to noise spectral density ($\theta_{m,l}$);
   second computer readable program code that enables a processor to relate a transponder input power ($x_{m,nli}$) to uplink path gain values for one or more sub-beams associated with the communication beam of interest ($a_{m,nl,kpj}$) and one or more interfering communication beams ($a_{m,kp,kpj}$);
   third computer readable program code that enables a processor to adjust a spectral overlap of the plurality of communication links ($\Delta_{m,nk}$) for uplink path gains from a plurality of communication beams ($a_{m,nl,kpj}$ and $a_{m,kp,kpj}$);
   fourth computer readable program code that enables a processor to define a first variable ($\theta''_{m,l}$) representative of a first multiplication of the adjusted spectral overlap factor ($\rho_{m,l,pj}$) and a noise factor ($\theta_{m,pj}$) in the transponder;
   fifth computer readable program code that enables a processor to define a second variable ($\delta''_{m,lp}$) representative of a second multiplication of the adjusted spectral overlap factor ($\rho_{m,l,pj}$) and the desired carrier to noise spectral density ($\phi_{m,pj}$) for the communication link of interest (i);
   sixth computer readable program code that enables a processor to define a normalized beam power ($r_{m,l}$) based on the first variable ($\theta''_{m,l}$) and the second variable ($\delta''_{m,lp}$);
   seventh computer readable program code that enables a processor to compute the transponder input power ($x_{m,nli}$) for the communication link of interest (i) using the normalized beam power ($r_{m,l}$); and
   wherein i and j represent communication link indices,
   k and n represent communication beam indices,
   n indicates a communication beam of interest, and
   m indicates a plurality of communication beams that do not include the communication beam of interest.

50. The computer program product of claim 49, further comprising:
   eighth computer readable program code that enables a processor to perform the instructions executed by the first, second, third, fourth, fifth, sixth, and seventh computer readable program code for one or more carrier signals in the WCDMA communications system; and
   ninth computer readable program code that enables a processor to assess an optimal balance between accuracy in the computation of power at the input of the transponder ($x_{m,nli}$) and complexity of the computation.

51. The computer program product of claim 49, wherein the first computer readable program code comprises:
   eighth computer readable program code that enables a processor to compute a carrier to noise spectral density for a communication link of interest ($c_{m,nli}$) and a spectral overlap of a plurality of communication links ($\Delta_{m,nk}$).

52. The computer program product of claim 49, wherein the fourth computer readable program code comprises:
    eighth computer readable program code that enables a processor to define the first variable ($\theta''_{m,l}$) as $$\theta''_{m,l} = \sum_p \sum_j \rho_{m,l,pj} \theta_{m,pj}.$$

53. The computer program product of claim 49, wherein the fifth computer readable program code comprises:
    eighth computer readable program code that enables a processor to define the second variable ($\delta''_{m,lp}$) as $$\delta''_{m,lp} = \sum_j \rho_{m,l,pj} \phi_{m,pj}.$$

54. The computer program product of claim 49, wherein the sixth computer readable program code comprises:
    eighth computer readable program code that enables a processor to define the normalized beam power ($r_{m,l}$) as $$r_{m,l} = \theta''_{m,l} + \sum_p \delta''_{m,lp} r_{m,p}.$$

55. The computer program product of claim 49, wherein the fifth computer readable program code comprises:
    eighth computer readable program code that enables a processor to calculate the normalized beam power ($r_{m,l}$) using a set of matrices, each matrix ($\Gamma_m$) in the set of matrices containing a plurality of matrix elements ($\gamma$).

56. The computer program product of claim 55, wherein the eighth computer readable program code comprises:
    ninth computer readable program code that enables a processor to assess whether each matrix ($\Gamma_m$) in the set of matrices has acceptable multiple access interference.

57. The computer program product of claim 49, wherein the seventh computer readable program code comprises:
    eighth computer readable program code that enables a processor to compute the normalized beam power ($r_{m,l}$) for each communication beam in the WCDMA communications system based on results executed by the first, second, third, fourth, fifth, and sixth computer readable program code.

58. A method for computing communication link supportability of a transponder in a WCDMA communications system in a user-to-base direction based on one or more sub-beams, the method comprising:
    (a) accounting for a desired carrier to noise spectral density for a communication link of interest ($\phi_{m,l}$) and a noise factor in the transponder ($\theta_{m,l}$) based on the desired carrier to noise spectral density ($\phi_{m,l}$);
    (b) relating a transponder input power ($x_{m,nli}$) to uplink path gain values for one or more sub-beams associated with the communication beam of interest ($a_{m,nl,kpj}$) and one or more interfering communication beams ($a_{m,kp,kpj}$);
    (c) adjusting a spectral overlap of the plurality of communication links ($\Delta_{m,nk}$) for uplink path gains from a plurality of communication beams and $a_{m,nl,kpj}$ and $a_{m,kp,kpj}$);
    (d) defining a first variable ($\theta''_{m,l}$) representative of a first multiplication of the adjusted spectral overlap factor ($\rho_{m,l,pj}$) and a noise factor ($\theta_{m,pj}$) in the transponder;
    (e) defining a second variable ($\delta''_{m,lp}$) representative of a second multiplication of the adjusted spectral overlap factor ($\rho_{m,l,pj}$) and the desired carrier to noise spectral density ($\phi_{m,pj}$) for the communication link of interest (i);
    (f) defining a normalized beam power ($r_{m,l}$) based on the first variable ($\theta''_{m,l}$) and the second variable ($\delta''_{m,lp}$);
    (g) computing the transponder input power ($x_{m,nli}$) for the communication link of interest (i) using the normalized beam power ($r_{m,l}$); and
    wherein i and j represent communication link indices,
    k and n represent communication beam indices,
    n indicates a communication beam of interest, and
    m indicates a plurality of communication beams that do not include the communication beam of interest.

59. A system configured to compute communication link supportability of a transponder in a Wideband Code Multiple Access (WCDMA) communications system in a user-to-base direction based on one or more sub-beams, the system comprising:
    one or more processors configured to execute modules comprising:
    an accounting module configured to account for a desired carrier to noise spectral density for a communication link of interest ($\phi_{m,l}$) and a noise factor in the transponder ($\theta_{m,l}$) based on the desired carrier to noise spectral density ($\phi_{m,l}$);
    a relation module configured to relate a transponder input power ($x_{m,nli}$) to uplink path gain values for one or more sub-beams associated with the communication beam of interest ($a_{m,nl,kpj}$) and one or more interfering communication beams ($a_{m,kp,kpj}$);
    an adjustment module configured to adjust a spectral overlap of the plurality of communication links ($\Delta_{m,nk}$) for uplink path gains from a plurality of communication beams ($a_{m,nl,kpj}$ and $a_{m,kp,kpj}$);
    a first definition module configured to define a first variable ($\theta''_{m,l}$) representative of a first multiplication of the adjusted spectral overlap factor ($\rho_{m,l,pj}$) and a noise factor ($\theta_{m,pj}$) in the transponder;
    a second definition module configured to define a second variable ($\delta''_{m,lp}$) representative of a second multiplication of the adjusted spectral overlap factor ($\rho_{m,l,pj}$) and the desired carrier to noise spectral density ($\phi_{m,pj}$) for the communication link of interest (i);
    a third definition module configured to define a normalized beam power ($r_{m,l}$) based on the first variable ($\theta''_{m,l}$) and the second variable ($\delta''_{m,lp}$);
    a computation module configured to compute the transponder input power ($x_{m,nli}$) for the communication link of interest (i) using the normalized beam power ($r_{m,l}$); and
    wherein i and j represent communication link indices,
    k and n represent communication beam indices,
    n indicates a communication beam of interest, and
    m indicates a plurality of communication beams that do not include the communication beam of interest.

60. A computer program product comprising a non-transitory computer-readable medium having computer program computer program code executable by a processor, where the computer program code includes:
    first computer readable program code that enables a processor to define an imperfect orthogonality factor ($\beta$) for one or more waveforms transmitted from the transponder to a user terminal, a carrier to noise spectral density for a communication link of interest ($c_{m,ni}$), a spectral overlap of a plurality of communication links ($\Delta_{m,nk}$), and a first variable ($d_{m,ni}$) representative of an operational power for the communication link of interest (i) in the B2U direction;

second computer readable program code that enables a processor to define a second variable ($\mu_{m,k,ni}$) representative of a corrected carrier to noise spectral density that takes into account the imperfect orthogonality factor ($\beta$);

third computer readable program code that enables a processor to define a third variable ($\phi'_{m,ni}$) representative of a relationship between the carrier to noise spectral density ($c_{m,ni}$) and the imperfect orthogonality factor ($\beta$) and a fourth variable ($\phi''_{m,ni}$) representative of a non-orthogonal version of the third variable ($\phi'_{m,ni}$);

fourth computer readable program code that enables a processor to define a fifth variable ($\theta'_{m,ni}$) representative of a relationship between the first variable ($d_{m,ni}$), the carrier to noise spectral density ($c_{m,ni}$), and the imperfect orthogonality factor ($\beta$);

fifth computer readable program code that enables a processor to apply reduced dimension spectral overlap values ($\delta'_{m,nk}$), based on a downlink path gain from the communication link of interest ($b_{m,n,ni}$) and one or more interfering communication links ($b_{m,k,ni}$), to an expression that defines a transponder output power ($y_{m,ni}$);

sixth computer readable program code that enables a processor to compute the transponder output power ($y_{m,ni}$) for the communication link of interest (i) using a composite power computation ($y_{m,n}$); and wherein i and j represent communication link indices,
k and n represent communication beam indices,
n indicates a communication beam of interest, and
m indicates a plurality of communication beams that do not include the communication beam of interest.

61. The computer program product of claim 60, further comprising:
seventh computer readable program code that enables a processor to perform the instructions executed by the first, second, third, fourth, and fifth computer readable program code for one or more carrier signals in the WCDMA communications system.

62. The computer program product of claim 60, wherein the first computer readable program code comprises:
seventh computer readable program code that enables a processor to compute a downlink path gain for the communication link of interest ($b_{m,n,ni}$) and for one or more interfering communication links ($b_{m,k,ni}$).

63. The computer program product of claim 60, wherein the first computer readable program code comprises:
seventh computer readable program code that enables a processor to define the carrier to noise spectral density for the communication link of interest ($c_{m,ni}$) as $$c_{m,ni} = \frac{y_{m,ni}}{\left[\beta_{m,ni}\sum_{kj \neq ni}\Delta_{m,nk}\left(\frac{b_{m,k,ni}}{b_{m,n,ni}}\right)y_{m,kj}\right] + \frac{KT_{Em,ni}}{b_{m,n,ni}}}$$

where K is Boltzmann's constant and $T_{Em,ni}$ is a noise temperature at an output of a satellite.

64. The computer program product of claim 60, wherein the first computer readable program code comprises:
seventh computer readable program code that enables a processor to define the first variable ($d_{m,ni}$) as $$d_{m,ni} \equiv \frac{c_{m,ni}KT_{Em,ni}}{b_{m,n,ni}}.$$

65. The computer program product of claim 60, wherein the second computer readable program code comprises:
seventh computer readable program code that enables a processor to define the second variable ($\mu_{m,k,ni}$) as $$\mu_{m,ni} \equiv c_{m,ni}\beta_{m,ni}.$$

66. The computer program product of claim 60, wherein the third computer readable program code comprises:
seventh computer readable program code that enables a processor to define the third variable ($\phi'_{m,ni}$) as $$\phi'_{m,ni} \equiv \frac{c_{m,ni}\beta_{m,ni}}{1 + c_{m,ni}\beta_{m,ni}\delta'_{m,nn}}.$$

67. The computer program product of claim 60, wherein the third computer readable program code comprises:
seventh computer readable program code that enables a processor to define the fourth variable ($\phi''_{m,ni}$) as $$\phi''_{m,ni} \equiv \frac{\phi'_{m,ni}}{\beta_{m,ni}} = \frac{c_{m,ni}}{1 + c_{m,ni}\beta_{m,ni}\delta'_{m,nn}}.$$

68. The computer program product of claim 60, wherein the fourth computer readable program code comprises:
seventh computer readable program code that enables a processor to define the fifth variable ($\theta'_{m,ni}$) as $$\theta'_{m,ni} \equiv \frac{d_{m,ni}}{1 + c_{m,ni}\beta_{m,n}\delta'_{m,nn}}.$$

69. The computer program product of claim 60, wherein the fifth computer readable program code comprises:
seventh computer readable program code that enables a processor to define the reduced dimension spectral overlap values ($\delta'_{m,nk}$) as $$\delta'_{m,nk} \equiv \Delta_{m,nk}\max_{i}\left(\frac{b_{m,k,ni}}{b_{m,n,ni}}\right).$$

70. The computer program product of claim 60, wherein the fifth computer readable program code comprises:
seventh computer readable program code that enables a processor to define the transponder output power ($y_{m,ni}$) as $$y_{m,ni} \cong \frac{c_{m,ni}KT_{Em,ni}}{b_{m,n,ni}} + c_{m,ni}\beta_{m,ni}\sum_{kj \neq ni}\delta'_{m,nk}y_{m,kj}.$$

71. The computer program product of claim 60,
wherein the fifth computer readable program code comprises:
seventh computer readable program code that enables a processor to reduce a dimensionality in the computation of communication link supportability.

72. The computer program product of claim 60,
wherein the fifth computer readable program code comprises:
seventh computer readable program code that enables a processor to calculate the transponder output power ($y_{m,ni}$) using a set of matrices, each matrix ($\Gamma_m$) in the set of matrices containing a plurality of matrix elements ($\gamma$).

73. The computer program product of claim 72, wherein the seventh computer readable program code comprises:
eighth computer readable program code that enables a processor to define each matrix element ($\gamma$) of each matrix ($\Gamma_m$) based on the reduced dimension spectral overlap values ($\delta'_{m,nk}$).

74. The computer program product of claim 73, wherein the eighth computer readable program code comprises:
ninth computer readable program code that enables a processor to define each matrix element ($\gamma$) comprises defining each matrix element ($\gamma$) as $$\gamma'_{m,nn} = \phi'_{m,nn} \delta'_{m,nn}$$

for one or more orthogonal waveforms transmitted from the transponder to the user terminal.

75. The computer program product of claim 73, wherein the eighth computer readable program code comprises:
ninth computer readable program code that enables a processor to define each matrix element ($\gamma$) comprises defining each matrix element ($\gamma$) as $$\gamma'_{m,nk} = \phi''_{m,nk} \delta'_{m,nk}$$

for one or more non-orthogonal waveforms transmitted from the transponder to the user terminal.

76. The computer program product of claim 72, wherein the seventh computer readable program code comprises:
eighth computer readable program code that enables a processor to assess whether each matrix ($\Gamma_m$) in the set of matrices has acceptable multiple access interference.

77. The computer program product of claim 60, wherein the sixth computer readable program code comprises:
seventh computer readable program code that enables a processor to compute a composite power for each communication beam ($y_{m,n}$) in the WCDMA communications system based on results from instructions executed by the first, second, third, fourth, and fifth computer readable program code.

78. A method for computing communication link supportability of a transponder in a WCDMA communications system in a base-to-user direction, the method comprising:
(a) defining an imperfect orthogonality factor ($\beta$) for one or more waveforms transmitted from the transponder to a user terminal, a carrier to noise spectral density for a communication link of interest ($c_{m,ni}$), a spectral overlap of a plurality of communication links ($\Delta_{m,nk}$), and a first variable ($d_{m,ni}$) representative of an operational power for the communication link of interest (i) in the B2U direction;
(b) defining a second variable ($\mu_{m,k,ni}$) representative of a corrected carrier to noise spectral density that takes into account the imperfect orthogonality factor ($\beta$);
(c) defining a third variable ($\phi'_{m,ni}$) representative of a relationship between the carrier to noise spectral density ($c_{m,ni}$) and the imperfect orthogonality factor ($\beta$) and a fourth variable ($\phi''_{m,ni}$) representative of a non-orthogonal version of the third variable ($\phi'_{m,ni}$);
(d) defining a fifth variable ($\theta'_{m,ni}$) representative of a relationship between the first variable ($d_{m,ni}$), the carrier to noise spectral density ($c_{m,ni}$), and the imperfect orthogonality factor ($\beta$);
(e) applying reduced dimension spectral overlap values ($\delta'_{m,nk}$), based on a downlink path gain from the communication link of interest ($b_{m,n,ni}$) and one or more interfering communication links ($b_{m,k,ni}$), to an expression that defines a transponder output power ($y_{m,ni}$);
(f) computing the transponder output power ($y_{m,ni}$) for the communication link of interest (i) using a composite power computation ($y_{m,n}$); and
wherein i and j represent communication link indices,
k and n represent communication beam indices,
n indicates a communication beam of interest, and
m indicates a plurality of communication beams that do not include the communication beam of interest.

79. A system configured to compute communication link supportability of a transponder in a Wideband Code Multiple Access (WCDMA) communications system in a base-to-user direction, the system comprising:
one or more processors configured to execute modules comprising:
a first definition module configured to define an imperfect orthogonality factor ($\beta$) for one or more waveforms transmitted from the transponder to a user terminal, a carrier to noise spectral density for a communication link of interest ($c_{m,ni}$), a spectral overlap of a plurality of communication links ($\Delta_{m,nk}$), and a first variable ($d_{m,ni}$) representative of an operational power for the communication link of interest (i) in the B2U direction;
a second definition module configured to define a second variable ($\mu_{m,k,ni}$) representative of a corrected carrier to noise spectral density that takes into account the imperfect orthogonality factor ($\beta$);
a third definition module configured to define a third variable ($\phi'_{m,ni}$) representative of a relationship between the carrier to noise spectral density ($c_{m,ni}$) and the imperfect orthogonality factor ($\beta$) and a fourth variable ($\phi''_{m,ni}$) representative of a non-orthogonal version of the third variable ($\phi'_{m,ni}$);
a fourth definition module configured to define a fifth variable ($\theta'_{m,ni}$) representative of a relationship between the first variable ($d_{m,ni}$), the carrier to noise spectral density ($c_{m,ni}$), and the imperfect orthogonality factor ($\beta$);
an application module configured to apply reduced dimension spectral overlap values ($\delta'_{m,nk}$), based on a downlink path gain from the communication link of interest ($b_{m,n,ni}$) and one or more interfering communication links ($b_{m,k,ni}$), to an expression that defines a transponder output power ($y_{m,ni}$);
a computation module configured to compute the transponder output power ($y_{m,ni}$) for the communication link of interest (i) using a composite power computation ($y_{m,n}$); and
wherein i and j represent communication link indices,
k and n represent communication beam indices,
n indicates a communication beam of interest, and
m indicates a plurality of communication beams that do not include the communication beam of interest.

80. A computer program product comprising a non-transitory computer-readable medium having computer program computer program code executable by a processor, where the computer program code includes:
first computer readable program code that enables a processor to compute a carrier to noise spectral density for a communication link of interest ($c_{m,ni}$) and a spectral overlap of a plurality of communication links ($\Delta_{m,nk}$);
second computer readable program code that enables a processor to define a first variable ($\phi_{mni}$), a second variable ($\phi'_{mni}$) representative of a relationship between the carrier to noise spectral density ($c_{m,ni}$) and an imperfect orthogonality factor ($\beta$), and a third variable ($\theta_{mni}$);

third computer readable program code that enables a processor to apply the first variable ($\phi_{mni}$), second variable ($\phi'_{mni}$), and third variable ($\theta_{mni}$) to an expression that defines a power parameter of the transponder ($w_{mni}$);

fourth computer readable program code that enables a processor to compute noise component values ($\sigma_{mnk}$), wherein the noise component values ($\sigma_{mnk}$) are incorporated into the power parameter of the transponder ($w_{mni}$);

fifth computer readable program code that enables a processor to define MAI-corrected noise and interference factors ($\vec{u}'_m, \vec{u}''_m,$ and $\vec{v}_m$), wherein the MAI-corrected noise and interference factors ($\vec{u}'_m, \vec{u}''_m,$ and $\vec{v}_m$) are incorporated into the power parameter of the transponder ($w_{mni}$);

sixth computer readable program code that enables a processor to compute a drive level of the transponder (z) based on a summation of the power parameter of the transponder ($w_m$); and wherein i and j represent communication link indices, k and n represent communication beam indices, n indicates a communication beam of interest, and m indicates a plurality of communication beams that do not include the communication beam of interest.

81. The computer program product of claim 80, wherein the first computer readable program code comprises:

seventh computer readable program code that enables a processor to compute uplink and downlink path gains for the communication link of interest ($a_{m,n,ni}$ and $b_{m,n,ni}$) uplink and downlink path gains for one or more interfering communication links ($a_{m,n,kj}$ and $b_{m,k,ni}$).

82. The computer program product of claim 80, wherein the first computer readable program code comprises:

seventh computer readable program code that enables a processor to compute uplink and downlink path gains for the communication link of interest ($a_{m,n,ni}$ and $b_{m,n,ni}$) and uplink and downlink path gains for one or more interfering communication links ($a_{m,n,kj}$ and $b_{m,k,ni}$).

83. The computer program product of claim 80, wherein the second computer readable program code comprises:

seventh computer readable program code that enables a processor to define the first variable ($\phi_{mni}$) as $$\phi_{mni} = \frac{c_{mni}}{(1 + c_{mni}\beta_{m,ni}\delta_{mnn})}.$$

84. The computer program product of claim 80, wherein the second computer readable program code comprises:

seventh computer readable program code that enables a processor to define the second variable ($\phi'_{mni}$) as $$\phi'_{mni} = \frac{c_{mni}\beta_{m,ni}}{(1 + c_{mni}\beta_{m,ni}\delta_{mnn})}.$$

85. The computer program product of claim 80, wherein the second computer readable program code comprises:

seventh computer readable program code that enables a processor to define the third variable ($\theta_{mni}$) as $$\theta_{mni} = \frac{d_{mni}}{(1 + c_{mni}\beta_{m,ni}\delta_{mnn})}.$$

86. The computer program product of claim 80, wherein the third computer readable program code comprises:

seventh computer readable program code that enables a processor to define the power parameter of the transponder ($w_{mni}$) as $$w_{mn} = \phi'_{mn}\sum_k \delta_{mnk}w_{m,k} + \phi_{mn}kT_{Sm}G_m + \phi_{mn}g(z)h(z)\frac{P}{B} + \theta_{mn}Pg(z).$$

where g(z) represents gain compression in the transponder, h(z) represents an intermodulation product in the transponder, and z represents a drive level of a non-linearity in the transponder.

87. The computer program product of claim 80, wherein the third computer readable program code comprises:

seventh computer readable program code that enables a processor to calculate the power parameter of the transponder ($w_{mni}$) using a set of matrices, each matrix ($\Gamma_m$) in the set of matrices containing a plurality of matrix elements ($\gamma$).

88. The computer program product of claim 80, wherein the fourth computer readable program code comprises:

seventh computer readable program code that enables a processor to define the noise component values ($\sigma_{mnk}$) as $$\sigma_{mnk} = \phi_{mn}kT_{Sm}G_m.$$

89. The computer program product of claim 88, wherein the seventh computer readable program code comprises:

eighth computer readable program code that enables a processor to calculate the power parameter of the transponder ($w_{mni}$) using a set of matrices and assessing whether each matrix ($\Gamma_m$) in the set of matrices has acceptable multiple access interference.

90. The computer program product of claim 80, wherein the fifth computer readable program code comprises:

seventh computer readable program code that enables a processor to define the MAI-corrected noise and interference factors ($\vec{u}'_m, \vec{u}''_m,$ and $\vec{v}_m$) as the following:

$$\vec{u}'_m = (I-\Gamma_m)^{-1}\vec{\sigma}_m;$$

$$\vec{u}''_m = (I-\delta_m)^{-1}\vec{\phi}_m; \text{ and}$$

$$\vec{v}_m = (I-\Gamma_m)^{-1}\vec{\theta}_m.$$

91. The computer program product of claim 80, wherein the sixth computer readable program code comprises:

seventh computer readable program code that enables a processor to sum the power parameter of the transponder ($w_m$) over one or more communication links, communication beams, and carrier signals that use the transponder.

92. A method for computing communication link supportability, comprising:

(a) computing a carrier to noise spectral density for a communication link of interest ($c_{m,ni}$) and a spectral overlap of a plurality of communication links ($\Delta_{m,nk}$);

(b) defining a first variable ($\phi_{mni}$), a second variable ($\phi'_{mni}$) representative of a relationship between the carrier to noise spectral density ($c_{m,ni}$) and an imperfect orthogonality factor ($\beta$), and a third variable ($\theta_{mni}$);
(c) applying the first variable ($\phi_{mni}$), second variable ($\phi'_{mni}$), and third variable ($\theta_{mni}$) to an expression that defines a power parameter of the transponder ($w_{mni}$);
(d) computing noise component values ($\sigma_{mnk}$), wherein the noise component values ($\sigma_{mnk}$) are incorporated into the power parameter of the transponder ($w_{mni}$);
(e) defining MAI-corrected noise and interference factors ($\vec{u}'_m, \vec{u}''_m$, and $\vec{v}_m$), wherein the MAI-corrected noise and interference factors ($\vec{u}'_m, \vec{u}''_m$, and $\vec{v}_m$) are incorporated into the power parameter of the transponder ($w_{mni}$);
(f) computing a drive level of the transponder (z) based on a summation of the power parameter of the transponder ($w_m$); and
wherein i and j represent communication link indices,
k and n represent communication beam indices,
n indicates a communication beam of interest, and
m indicates a plurality of communication beams that do not include the communication beam of interest.

93. A system configured to compute communication link supportability of a transponder in a Wideband Code Multiple Access (WCDMA) communications system that incorporates non-ideal characteristics of the transponder and a communication path between the transponder and an access module, the system comprising:
one or more processors configured to execute modules comprising:
a first computation module configured to compute a carrier to noise spectral density for a communication link of interest ($c_{m,ni}$) and a spectral overlap of a plurality of communication links ($\Delta_{m,nk}$);
a first definition module configured to define a first variable ($\phi_{mni}$), a second variable ($\phi'_{mni}$) representative of a relationship between the carrier to noise spectral density ($c_{m,ni}$) and an imperfect orthogonality factor ($\beta$), and a third variable ($\theta_{mni}$);
an application module configured to apply the first variable ($\theta_{mni}$), second variable ($\phi'_{mni}$), and third variable ($\theta_{mni}$) to an expression that defines a power parameter of the transponder ($w_{mni}$);
a second computation module configured to compute noise component values ($\sigma_{mnk}$), wherein the noise component values ($\sigma_{mnk}$) are incorporated into the power parameter of the transponder ($w_{mni}$);
a second definition module configured to define MAI-corrected noise and interference factors ($\vec{u}'_m, \vec{u}''_m$, and $\vec{v}_m$), wherein the MAI-corrected noise and interference factors ($\vec{u}'_m, \vec{u}''_m$, and $\vec{v}_m$) are incorporated into the power parameter of the transponder ($w_{mni}$);
a third computation module configured to compute a drive level of the transponder (z) based on a summation of the power parameter of the transponder ($w_m$); and
wherein i and j represent communication link indices,
k and n represent communication beam indices,
n indicates a communication beam of interest, and
m indicates a plurality of communication beams that do not include the communication beam of interest.

* * * * *

UNITED STATES PATENT AND TRADEMARK OFFICE
CERTIFICATE OF CORRECTION

PATENT NO. : 8,331,281 B2
APPLICATION NO. : 12/245452
DATED : December 11, 2012
INVENTOR(S) : James Wade Marshall It is certified that error appears in the above-identified patent and that said Letters Patent is hereby corrected as shown below:

Column 33, Line 32, replace "comprises" with --by--.

Column 33, Line 48, replace "comprises" with --by--.

Column 35, Line 40, replace "comprises" with --comprising--.

Column 36, Line 49, replace "$(\mu_{m,n,kj})$" with --$(\rho_{m,n,kj})$--.

Column 38, Line 25, replace "computing" with --(f) computing--.

Column 40, Line 21, replace "comprises with --by--.

Column 40, Line 34, replace "comprises" with --by--.

Column 40, Line 55, replace "$(\delta_m)$" with --$(\Gamma_m)$--.

Column 43, Line 66, replace "and $a_{m,nl,kpj}$" with --$(a_{m,nl,kpj}$--.

Column 44, Line 60, delete "computer program".

Column 47, Line 17, replace "comprises" with --by--.

Column 47, Line 26, replace "comprises" with --by--.

Column 48, Line 59, delete "computer program".

Column 49, Line 15, replace "hd m" with --$_m$--.

Column 49, Line 34, please add --and-- at end of the line.

Column 50, Line 50, replace "$(I-\delta_m)$" with --$(I-\Gamma_m)$--.

Signed and Sealed this
Twenty-ninth Day of January, 2013

David J. Kappos
*Director of the United States Patent and Trademark Office*